US010483596B2

(12) United States Patent
Hayashi et al.

(10) Patent No.: US 10,483,596 B2
(45) Date of Patent: Nov. 19, 2019

(54) SECONDARY BATTERY WITH HYDROXIDE-ION-CONDUCTING CERAMIC SEPARATOR

(71) Applicant: NGK INSULATORS, LTD., Nagoya-Shi (JP)

(72) Inventors: Hiroshi Hayashi, Nagoya (JP); Kenshin Kitoh, Nagoya (JP); Naohito Yamada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 71 days.

(21) Appl. No.: 15/493,599

(22) Filed: Apr. 21, 2017

(65) Prior Publication Data

US 2017/0222271 A1 Aug. 3, 2017

Related U.S. Application Data

(63) Continuation of application No. PCT/JP2015/080931, filed on Nov. 2, 2015.

(30) Foreign Application Priority Data

Nov. 25, 2014 (JP) ................................ 2014-238270

(51) Int. Cl.
*H01M 2/16* (2006.01)
*H01M 10/30* (2006.01)
(Continued)

(52) U.S. Cl.
CPC ......... *H01M 10/30* (2013.01); *H01M 2/1646* (2013.01); *H01M 2/1686* (2013.01);
(Continued)

(58) Field of Classification Search
CPC .......... H01M 10/30; H01M 2/14; H01M 4/52; H01M 4/48; H01M 4/38; H01M 2/16; H01M 10/34; H01M 10/28
See application file for complete search history.

(56) References Cited

U.S. PATENT DOCUMENTS 5,707,756 A * 1/1998 Inoue .................. H01M 2/1235 429/57
5,824,434 A 10/1998 Kawakami et al.
(Continued)

FOREIGN PATENT DOCUMENTS

CN 101867068 * 10/2010 ............ H01M 10/30
JP 06-196199 A1 7/1994
(Continued)

OTHER PUBLICATIONS

Machine translation of CN 101867068, retrieved from <https://worldwide.espacenet.com/?locale=en_EP>, on Jan. 3, 2018.*
(Continued)

*Primary Examiner* — Cynthia K Walls
(74) *Attorney, Agent, or Firm* — Burr & Brown, PLLC

(57) ABSTRACT

Provided is a secondary battery including a hydroxide-ion-conductive ceramic separator. The secondary battery includes a positive electrode; a negative electrode; an alkaline electrolytic solution; a ceramic separator that is composed of a hydroxide-ion-conductive inorganic solid electrolyte and separates the positive electrode from the negative electrode; a porous substrate disposed on at least one surface of the ceramic separator; and a container accommodating at least the negative electrode and the alkaline electrolytic solution, wherein the inorganic solid electrolyte is in the form of a membrane or layer densified enough to have water impermeability, and the porous substrate has a thickness of 100 to 1,800 μm. According to the secondary battery of the present invention, the thickness and resistance of the ceramic separator are decreased without concern for reduced strength, and a reduction in energy density and an increase in internal resistance are effectively prevented.

16 Claims, 13 Drawing Sheets

(51) Int. Cl.

| | |
|---|---|
| ***H01M 4/52*** | (2010.01) |
| ***H01M 10/26*** | (2006.01) |
| ***H01M 12/08*** | (2006.01) |
| ***H01M 4/24*** | (2006.01) |
| ***H01M 4/32*** | (2006.01) |
| ***H01M 10/34*** | (2006.01) |

(52) U.S. Cl.

CPC ............. *H01M 4/244* (2013.01); *H01M 4/32* (2013.01); *H01M 4/52* (2013.01); *H01M 10/26* (2013.01); *H01M 10/347* (2013.01); *H01M 12/08* (2013.01); *H01M 2300/0068* (2013.01); *H01M 2300/0071* (2013.01); *H01M 2300/0094* (2013.01); *Y02E 60/128* (2013.01)

(56) References Cited

U.S. PATENT DOCUMENTS

| | | | | |
|---|---|---|---|---|
| 6,183,900 | B1 * | 2/2001 | Bronoel .............. | H01M 2/1653 429/101 |
| 2003/0165738 | A1 | 9/2003 | Bronoel et al. | |
| 2005/0003271 | A1 | 1/2005 | Jiang et al. | |
| 2013/0183569 | A1 | 7/2013 | Hayakawa et al. | |
| 2014/0227616 | A1 | 8/2014 | Yamada et al. | |
| 2014/0315099 | A1 | 10/2014 | Yamada et al. | |
| 2015/0024292 | A1 | 1/2015 | Yamada et al. | |

FOREIGN PATENT DOCUMENTS

| | | | |
|---|---|---|---|
| JP | 2001-500661 | A1 | 1/2001 |
| JP | 2003-510791 | A1 | 3/2003 |
| JP | 2007-516567 | A1 | 6/2007 |
| JP | 2012-054039 | A1 | 3/2012 |
| JP | 2013-191523 | A | 9/2013 |
| JP | 2014-194897 | A1 | 10/2014 |
| WO | 2012/036025 | A1 | 3/2012 |
| WO | 2013/073292 | A1 | 5/2013 |
| WO | 2013/118561 | A1 | 8/2013 |
| WO | 2013/161516 | A1 | 10/2013 |
| WO | 103947036 | A | 7/2014 |
| WO | 104067437 | A | 9/2014 |

OTHER PUBLICATIONS

International Search Report and Written Opinion (Application No. PCT/JP2015/080931) dated Dec. 22, 2015 (with English translation).

Chinese Office Action (with English translation), Chinese Application No. 201580058434.X, dated Mar. 21, 2019.

European Office Action, European Application No. 15 863 659.7, dated Sep. 6, 2019 (6 pages).

* cited by examiner

SECONDARY BATTERY WITH HYDROXIDE-ION-CONDUCTING CERAMIC SEPARATOR

CROSS-REFERENCE TO RELATED APPLICATIONS

This application is a continuation application of PCT/JP2015/080931 filed Nov. 2, 2015, which claims priority to Japanese Patent Application No. 2014-238270 filed Nov. 25, 2014, the entire contents all of which are incorporated herein by reference.

BACKGROUND OF THE INVENTION

1. Field of the Invention

The present invention relates to a secondary battery including a hydroxide-ion-conductive ceramic separator.

2. Description of the Related Art

Zinc secondary batteries, such as nickel-zinc secondary batteries and zinc-air secondary batteries, have been developed and studied over many years. Unfortunately, these batteries have not yet been put into practice. This is due to a problem that zinc contained in the negative electrode forms dendritic crystals, i.e. dendrites, during a charge mode of the battery and the dendrites break the separator to cause short circuit between the negative electrode and the positive electrode. Thus, a strong demand has arisen for a technique for preventing the short circuit caused by dendritic zinc in zinc secondary batteries, such as nickel-zinc secondary batteries and zinc-air secondary batteries.

In order to meet such a demand, batteries including hydroxide-ion-conductive ceramic separators have been proposed. For example, Patent Document 1 (WO2013/118561) discloses a nickel-zinc secondary battery including a separator composed of a hydroxide-ion-conductive inorganic solid electrolyte between a positive electrode and a negative electrode for preventing the short circuit caused by dendritic zinc, wherein the inorganic solid electrolyte is a layered double hydroxide (LDH) having a basic composition represented by the formula: $M^{2+}_{1-x}M^{3+}_{x}(OH)_2A^{n-}_{x/n}.mH_2O$ (wherein $M^{2+}$ represents at least one type of divalent cation, $M^{3+}$ represents at least one type of trivalent cation, $A^{n-}$ represents an n-valent anion, n is an integer of 1 or more, and x is 0.1 to 0.4). Patent Document 2 (WO2013/073292) discloses a zinc-air secondary battery including a separator composed of a layered double hydroxide (LDH) having the same basic composition as that in Patent Document 1 and disposed on one surface of the air electrode for preventing a short circuit caused by dendritic zinc between the positive and negative electrodes during a charge mode of the battery and also preventing the intrusion of carbon dioxide into the electrolytic solution.

Patent Document 3 (WO2013/161516) discloses an application of a hydroxide-ion-conductive ceramic separator to a battery other than a zinc secondary battery; specifically, a lithium-air secondary battery including, as an anion exchanger, an inorganic solid electrolyte composed of a layered double hydroxide (LDH) having the aforementioned basic composition. According to this patent document, the anion exchanger can prevent the intrusion of carbon dioxide into the battery.

CITATION LIST

Patent Documents

Patent Document 1: WO2013/118561
Patent Document 2: WO2013/073292
Patent Document 3: WO2013/161516

SUMMARY OF THE INVENTION

The present applicant has already successfully developed a highly-densified ceramic separator (inorganic solid electrolyte separator) exhibiting hydroxide ion conductivity and yet water impermeability and gas impermeability. The present applicant has also successfully formed such a ceramic separator on a porous substrate (e.g., an alumina porous substrate). The use of such a separator (or a separator provided with a porous substrate) in a secondary battery, such as a zinc-nickel battery or a zinc-air secondary battery, can prevent the short circuit caused by dendritic zinc or the intrusion of carbon dioxide (which may cause problems especially in a metal-air secondary battery). The maximization of such an effect requires reliable separation of the positive electrode side from the negative electrode side by a hydroxide-ion-conductive ceramic separator in a battery container. Thus, the ceramic separator needs to have a certain level of strength. Unfortunately, an increase in the thickness of the hydroxide-ion-conductive ceramic separator for enhancing the strength thereof undesirably leads to an increase in the resistance of the ceramic separator. Hence, the hydroxide-ion-conductive ceramic separator is demanded to have a practically acceptable strength with reduced thickness and low resistance. As described above, the formation of the ceramic separator on the porous substrate (e.g., an alumina porous substrate) is an effective measure for decreasing the thickness of the ceramic separator with reduced concern for strength. The incorporation of the porous substrate into the secondary battery, however, may cause another problem in terms of a reduction in the energy density of the battery or an increase in the internal resistance of the battery. Under the assumption that the volume of the secondary battery remains constant, an increase in the thickness of the porous substrate leads to a reduction in the amount of an electrode active material to be charged into the battery, resulting in reduced energy density of the battery. An increase in the resistance of the porous substrate leads to an increase in the internal resistance of the secondary battery.

The present inventors have found that the disposition of a porous substrate having a predetermined specification on at least one surface of a ceramic separator composed of a hydroxide-ion-conductive inorganic solid electrolyte in a secondary battery can decrease the thickness and resistance of the ceramic separator without concern for reduced strength, and can also effectively prevent a reduction in energy density and an increase in internal resistance, which would otherwise occur in association with the incorporation of the porous substrate in the battery.

An object of the present invention is to provide a secondary battery comprising a ceramic separator composed of a hydroxide-ion-conductive inorganic solid electrolyte, wherein the thickness and resistance of the ceramic separator are decreased without concern for reduced strength, and a reduction in energy density and an increase in internal resistance are effectively prevented.

An aspect of the present invention provides a secondary battery comprising a positive electrode, a negative electrode, an alkaline electrolytic solution, a ceramic separator that is composed of a hydroxide-ion-conductive inorganic solid electrolyte and separates the positive electrode from the negative electrode, a porous substrate disposed on at least one surface of the ceramic separator, and a container accommodating at least the negative electrode and the alkaline electrolytic solution, wherein the inorganic solid electrolyte is in the form of a membrane or layer densified enough to have water impermeability, and the porous substrate has a thickness of 100 to 1,800 μm.

In a preferred aspect of the present invention, the positive electrode comprises nickel hydroxide and/or nickel oxyhydroxide;

the electrolytic solution comprises a positive-electrode electrolytic solution in which the positive electrode is immersed, and a negative-electrode electrolytic solution in which the negative electrode is immersed;

the container accommodates the positive electrode, the positive-electrode electrolytic solution, the negative electrode, the negative-electrode electrolytic solution, the ceramic separator, and the porous substrate; and the ceramic separator is disposed in the container to separate a positive-electrode chamber accommodating the positive electrode and the positive-electrode electrolytic solution from a negative-electrode chamber accommodating the negative electrode and the negative-electrode electrolytic solution, whereby the battery may serve as a nickel-zinc secondary battery.

In another preferred aspect of the present invention, the positive electrode is an air electrode;

the negative electrode is immersed in the electrolytic solution;

the container has an opening and accommodates the negative electrode and the electrolytic solution; and the ceramic separator is disposed to cover the opening to be in contact with the electrolytic solution and to define a negative-electrode hermetic space with the container, such that the air electrode is separated from the electrolytic solution by the ceramic separator through which hydroxide ions pass, whereby the battery may serve as a zinc-air secondary battery.

DETAILED DESCRIPTION OF THE INVENTION

Secondary Battery

Figure 1A:
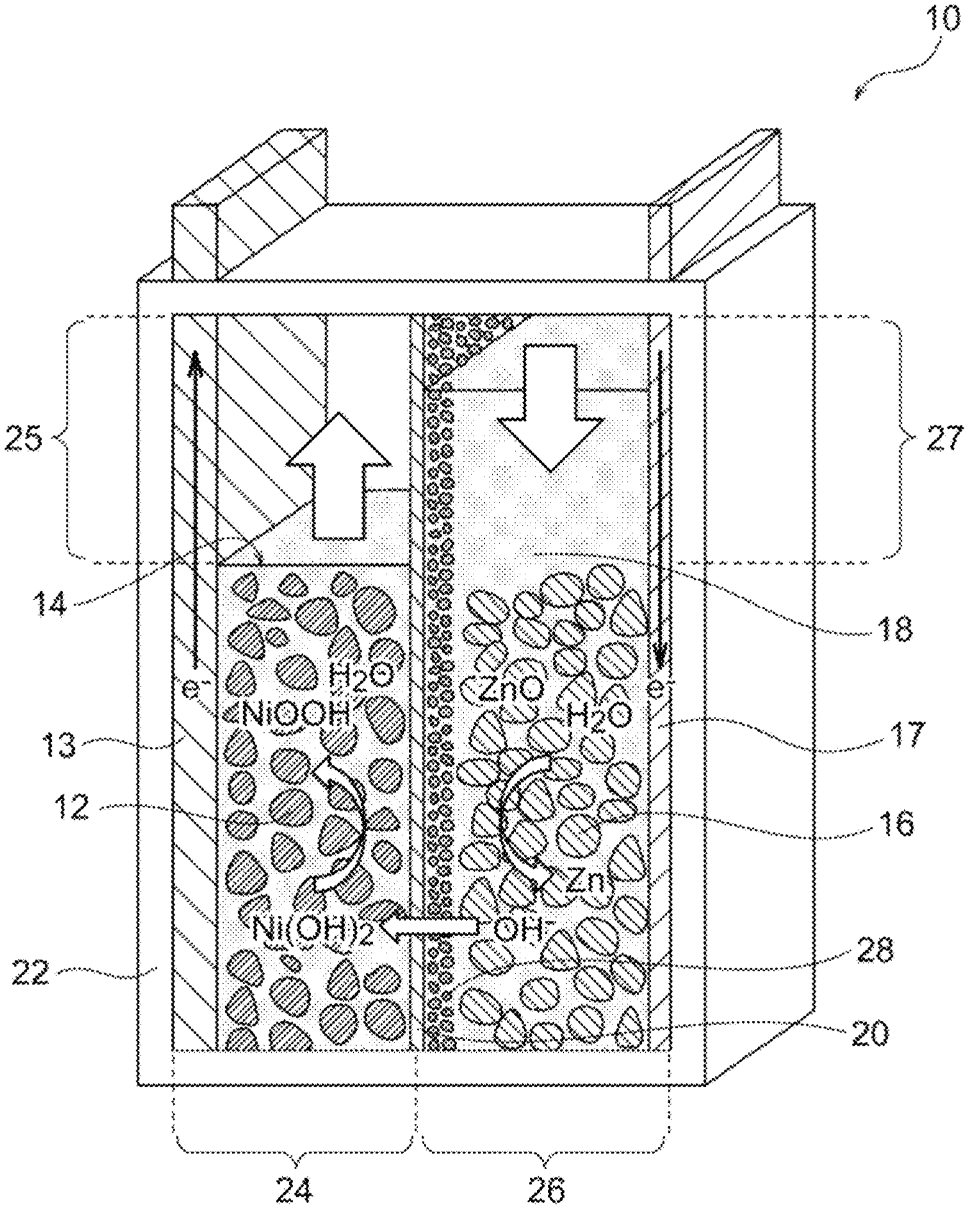
FIG. 1A is a schematic illustration of an exemplary nickel-zinc battery according to an embodiment of the present invention, the battery being in a discharge end state.

The secondary battery of the present invention includes a hydroxide-ion-conductive ceramic separator. The secondary battery of the present invention may be of any type to which a hydroxide-ion-conductive ceramic separator can be applied; for example, any alkaline zinc secondary battery, such as a nickel-zinc secondary battery, a silver oxide-zinc secondary battery, a manganese oxide-zinc secondary battery, or a zinc-air secondary battery; or a lithium-air secondary battery. Particularly preferred are a nickel-zinc secondary battery and a zinc-air secondary battery, the nickel-zinc secondary battery being more preferred. Although the present invention will be described in detail below with reference to a nickel-zinc secondary battery (FIGS. 1A and 1B) and a zinc-air secondary battery (FIGS. 3A and 3B), the present invention should not be construed to be limited to these secondary batteries. Thus, the present invention encompasses any secondary battery to which a hydroxide-ion-conductive ceramic separator can be applied.

A secondary battery according to an embodiment of the present invention includes a positive electrode, a negative electrode, an alkaline electrolytic solution, a ceramic separator, a porous substrate, and a container. The ceramic separator is composed of a hydroxide-ion-conductive inorganic solid electrolyte and separates the positive electrode from the negative electrode. The inorganic solid electrolyte is in the form of a membrane or layer densified enough to have water impermeability. The porous substrate (preferably a ceramic porous substrate) is disposed on at least one surface of the ceramic separator. The porous substrate has a thickness of 100 to 1,800 μm. The positive electrode may be appropriately selected depending on the type of the secondary battery. The positive electrode may be an air electrode. The negative electrode may also be appropriately selected depending on the type of the secondary battery. In the case of a zinc secondary battery, the negative electrode may contain zinc, a zinc alloy, and/or a zinc compound. The container accommodates at least the negative electrode and the alkaline electrolytic solution. In a nickel-zinc secondary battery 10 illustrated in FIG. 1A, a container 22 accommodates a positive electrode 12 and a positive-electrode electrolytic solution 14. In a zinc-air secondary battery 30 illustrated in FIG. 3A including an air electrode 32 serving as a positive electrode, the air electrode 32 (positive electrode) is not necessarily accommodated in a container 46 completely and may be disposed (e.g., in the form of a lid) to cover an opening 46*a* of the container 46. The positive electrode is not necessarily separated from the alkaline electrolytic solution, and the positive electrode and the alkaline electrolyte may be combined together to form a positive-electrode mixture. The positive electrode in the form of an air electrode does not require an electrolytic solution in the positive electrode side. The negative electrode is not necessarily separated from the alkaline electrolytic solution, and the negative electrode and the alkaline electrolytic solution may be combined together to form a negative-electrode mixture. A positive-electrode collector may optionally be disposed in contact with the positive electrode, and a negative-electrode collector may optionally be disposed in contact with the negative electrode.

The ceramic separator (hereinafter referred to simply as "separator") is disposed to separate the positive electrode from the negative electrode. As in the nickel-zinc secondary battery 10 illustrated in FIG. 1A, the separator 20 may be disposed in the container 22 to separate the positive-electrode chamber 24 accommodating the positive electrode 12 and the positive-electrode electrolytic solution 14 from the negative-electrode chamber 26 accommodating the negative electrode 16 and the negative-electrode electrolytic solution 18. Alternatively, as in the zinc-air secondary battery 30 illustrated in FIG. 3A, the separator 40 may be disposed to cover the opening 46*a* of the container 46 such that the separator 40 is in contact with the electrolytic solution 36 and defines a negative-electrode hermetic space with the container 46. The separator preferably has hydroxide ion conductivity as well as water impermeability (preferably water impermeability and gas impermeability). The expression "separator has water impermeability and gas impermeability" refers to that the separator has a density sufficiently high to prevent the permeation of water and gas and is not a porous film or porous material having water or gas permeability. Thus, the aforementioned configuration of the zinc secondary battery is very effective for physically inhibiting the penetration of dendritic zinc (which may be formed during a charge mode of the battery) through the separator, to prevent the short circuit between the positive and negative electrodes. Meanwhile, the aforementioned configuration of the metal-air secondary battery is very effective for inhibiting the intrusion of carbon dioxide contained in air, to prevent precipitation of an alkaline carbonate (caused by carbon dioxide) in the electrolytic solution. In any case, the hydroxide ion conductivity of the ceramic separator leads to efficient migration of hydroxide ions between the positive electrode side (e.g., alkaline electrolytic solution or air electrode) and the negative electrode side (e.g., alkaline electrolytic solution), resulting in charge/discharge reaction between the positive and negative electrodes.

The ceramic separator is composed of an inorganic solid electrolyte exhibiting hydroxide ion conductivity. The use of the separator composed of a hydroxide-ion-conductive inorganic solid electrolyte separates the electrolytic solutions between the positive and negative electrodes, and ensures conduction of hydroxide ions. The inorganic solid electrolyte is desirably densified to exhibit water impermeability and gas impermeability (preferably water impermeability and gas impermeability). For example, the inorganic solid electrolyte has a relative density of preferably 90% or more, more preferably 92% or more, still more preferably 95% or more, as determined by the Archimedes method. The density may be any value so long as the inorganic solid electrolyte is dense and hard enough to prevent the penetration of dendritic zinc. Such a dense and hard inorganic solid electrolyte may be produced through hydrothermal treatment. Thus, a green compact which has not undergone hydrothermal treatment is not suitable as the inorganic solid electrolyte in the present invention because the compact is not dense and brittle in the solution. Any process other than hydrothermal treatment may be used for producing a dense and hard inorganic solid electrolyte.

The ceramic separator or the inorganic solid electrolyte may be in the form of a composite body containing particles of an organic solid electrolyte exhibiting hydroxide ion conductivity and an auxiliary component that promotes the densification or hardening of the particles. Alternatively, the separator may be in the form of a composite body containing a porous body serving as a substrate and an inorganic solid electrolyte (e.g., a layered double hydroxide) that is precipitated and grown in pores of the porous body. Examples of the materials of the porous body include ceramic materials, such as alumina and zirconia; and insulating materials, such as porous sheets composed of foamed resin or fibrous material.

The inorganic solid electrolyte preferably contains a layered double hydroxide (LDH) having a basic composition represented by the formula: $M^{2+}{}_{1-x}M^{3+}{}_{x}(OH)_2A^{n-}{}_{x/n}.mH_2O$ (wherein $M^{2+}$ represents a divalent cation, $M^{3+}$ represents a trivalent cation, $A^{n-}$ represents an n-valent anion, n is an integer of 1 or more, and x is 0.1 to 0.4). The inorganic solid electrolyte is more preferably composed of such an LDH. In the formula, $M^{2+}$ may represent any divalent cation, and is preferably $Mg^{2+}$, $Ca^{2+}$ or $Zn^{2+}$, more preferably $Mg^{2+}$. $M^{3+}$ may represent any trivalent cation, and is preferably $Al^{3+}$ or $Cr^{3+}$, more preferably $Al^{3+}$. $A^{n-}$ may represent any anion, and is preferably $OH^-$ or $CO_3{}^{2-}$. In the formula, preferably, $M^{2+}$ comprises $Mg^{2+}$, $M^{3+}$ comprises $Al^{3+}$, and $A^{n-}$ comprises $OH^-$ and/or $CO_3{}^{2-}$. In the formula, n is an integer of 1 or more, preferably 1 or 2; x is 0.1 to 0.4, preferably 0.2 to 0.35; and m is any real number. In the formula, $M^{3+}$ may be partially or entirely replaced with a cation having a valency of 4 or more. In such a case, the coefficient x/n of the anion $A^{n-}$ in the formula may be appropriately varied.

The inorganic solid electrolyte is preferably densified through hydrothermal treatment (i.e., a hydrothermally synthesized product). The hydrothermal treatment is very effective for the densification of a layered double hydroxide, in particular, an Mg—Al layered double hydroxide. The densification by the hydrothermal treatment involves, for example, a process described in Patent Document 1 (WO2013/118561), in which pure water and a green compact plate treated in a pressure container at a temperature of 120 to 250° C., preferably 180 to 250° C. for 2 to 24 hours, preferably 3 to 10 hours. A more preferred process involving the hydrothermal treatment will be described below.

The inorganic solid electrolyte may be in a membrane or layer form that is densified to exhibit water impermeability. The inorganic solid electrolyte in a membrane or layer form is preferably disposed on or in the porous substrate. The inorganic solid electrolyte in a membrane or layer form having a thickness smaller than that of the plate is advantageous in that the electrolyte has a minimum hardness required for preventing the penetration of dendritic zinc and significantly reduces the resistance of the separator. The inorganic solid electrolyte in a membrane or layer form has a thickness of preferably 100 μm or less, more preferably 75 μm or less, still more preferably 50 μm or less, particularly preferably 25 μm or less, most preferably 5 μm or less. Such a small thickness achieves a reduction in resistance of the separator. The lower limit of the thickness may vary depending on the intended use of the inorganic solid electrolyte. The thickness is preferably 1 μm or more, more preferably 2 μm or more in order to secure a hardness required for a separator membrane or layer.

A porous substrate is disposed on at least one surface of the ceramic separator. The porous substrate 28 has water permeability, and thus the alkaline electrolytic solution permeates the substrate and reaches the separator. The presence of the porous substrate leads to reliable retention of hydroxide ions on the separator. The strength imparted by the porous substrate can reduce the thickness of the separator, resulting in a reduction in resistance. A dense membrane or layer of the inorganic solid electrolyte (preferably LDH) may be formed on or in the porous substrate. The disposition of the porous substrate on one surface of the separator probably involves a process including preparation of the porous substrate and formation of a membrane of the inorganic solid electrolyte on the porous substrate (this process will be described below). In contrast, the disposition of the porous substrate on the two surfaces of the separator probably involves a process including densification of the raw powder of the inorganic solid electrolyte disposed between two porous substrates. With reference to FIG. 1A, the porous substrate 28 is disposed entirely on one surface of the separator 20. Alternatively, the porous substrate 28 may be disposed only on a portion (e.g., a region responsible for charge/discharge reaction) of one surface of the separator 20. For example, the formation of a membrane or layer of the inorganic solid electrolyte on or in the porous substrate typically leads to the process-derived structure; i.e., the porous substrate is disposed entirely on one surface of the separator. In contrast, the formation of an independent plate of the inorganic solid electrolyte (having no substrate) may involve the subsequent step of disposing the porous substrate on a portion (e.g., a region responsible for charge/discharge reaction) or the entirety of one surface of the separator.

The porous substrate has a thickness of 100 to 1,800 μm, preferably 150 to 1,500 μm, more preferably 200 to 900 μm, still more preferably 250 to 700 μm, particularly preferably 250 to 500 μm. As described above, an increase in the thickness of the hydroxide-ion-conductive ceramic separator for enhancing the strength thereof undesirably leads to an increase in the resistance of the ceramic separator. Hence, the hydroxide-ion-conductive ceramic separator is demanded to have a practically acceptable strength with reduced thickness and low resistance. As described above, the formation of the ceramic separator on the porous substrate (e.g., an alumina porous substrate) is an effective measure for decreasing the thickness of the ceramic separator with reduced concern for strength. The incorporation of the porous substrate into the secondary battery, however, may cause another problem in terms of a reduction in the energy density of the battery or an increase in the internal resistance of the battery. Under the assumption that the volume of the secondary battery remains constant, an increase in the thickness of the porous substrate leads to a reduction in the amount of an electrode active material to be charged into the battery, resulting in reduced energy density of the battery. An increase in the resistance of the porous substrate leads to an increase in the internal resistance of the secondary battery. If the porous substrate has a thickness within the aforementioned range, the thickness and resistance of the ceramic separator can be decreased without concern for reduced strength, and a reduction in energy density and an increase in internal resistance, which would otherwise occur in association with the incorporation of the porous substrate, can be effectively prevented. The porous substrate having a thickness within the aforementioned range is less likely to break and thus is readily prepared and handled.

The porous substrate has a porosity of preferably 10 to 90%, more preferably 15 to 80%, still more preferably 20 to 70%, still more preferably 30 to 70%, particularly preferably 30 to 60%. The porosity within the above range is more preferably achieved in combination with the aforementioned thickness of the porous substrate. The porous substrate having a porosity within such a range exhibits desired water permeability, and thus the electrolytic solution efficiently reaches and comes into contact with the ceramic separator, resulting in satisfactory performance of the battery. An LDH-containing separator layer having a density enough to exhibit water impermeability can be formed on the surface of the porous substrate having a porosity within the aforementioned range. An increase in the porosity of the porous substrate leads to a reduction in internal resistance. The porous substrate having a porosity within the aforementioned range is less likely to break and thus is readily prepared and handled.

Preferably, the porosity of the porous substrate is measured on the basis of a surface of the porous substrate because it can be readily measured by image processing described below and substantially reflects the internal porosity of the porous substrate. Thus, if the surface of the porous substrate is dense, the inside of the porous substrate is also dense. In the present invention, the porosity at the surface of the porous substrate can be measured by a method involving image processing as follows: 1) an electron microscopic (SEM) image of the surface of the porous substrate is taken at a magnification of 10,000 or more; 2) the grayscale SEM image is read with an image analysis software, such as Photoshop (manufactured by Adobe); 3) a monochromatic binary image is prepared with tools named [image], [color compensation], and [binarization] in this order; and 4) the porosity (%) is calculated by dividing the number of pixels of the black area(s) by the number of all the pixels of the image. Preferably, the porosity is measured over a 6 μm×6 μm area of the surface of the porous substrate by image processing. More preferably, the porosities in three 6 μm×6 μm areas selected at random are averaged for objective evaluation.

The porous substrate exhibits a T×D/100 value of preferably 50 to 400, more preferably 50 to 350, still more preferably 50 to 300, particularly preferably 100 to 300, most preferably 100 to 250, where T represents the thickness (μm) of the porous substrate, D represents the relative density (100−P) (%), and P represents the porosity (%) of the porous substrate. Without taking into account of strength, the porous substrate having a small thickness and a high porosity contributes to an improvement in battery performance. That is, a decrease in thickness leads to reduced internal resistance, and an increase in porosity also leads to reduced internal resistance because the electrolytic solution readily reaches and comes into contact with the ceramic separator. Unfortunately, the porous substrate having small thickness and high porosity exhibits reduced strength and is difficult to handle, and thus the porous substrate can be unsuitable for industrial production of batteries. In contrast, an increase in the thickness of the porous substrate leads to improved strength but reduced energy density of the battery. The porosity P is decreased (i.e., the relative density D is increased) in the case of small thickness T, whereas the porosity P is increased (i.e., the relative density D is decreased) in the case of large thickness T so that the T×D/100 value falls within the aforementioned range. Thus, the compatibility between high energy density and low internal resistance can be desirably achieved while the strength of the porous substrate is maintained as much as possible.

The porous substrate has an average pore size of preferably 0.001 to 1.5 μm, more preferably 0.001 to 1.25 μm, still more preferably 0.001 to 1.0 μm, particularly preferably 0.001 to 0.75 μm, most preferably 0.001 to 0.5 μm. These ranges make it possible to form a dense LDH-containing separator exhibiting water impermeability while ensuring desired water permeability in the porous substrate. In the present invention, the average pore size can be determined by measuring the largest length of each pore in an electron microscopic (SEM) image of the surface of the porous substrate. The magnification of the electron microscopic (SEM) image used in this measurement is 20,000 or more. All the measured pore sizes are listed in order of size to calculate the average, from which the subsequent 15 larger sizes and the subsequent 15 smaller sizes, i.e., 30 diameters in total, are selected in one field of view. The pore sizes can be measured by, for example, a length-measuring function of a SEM or image analysis software (e.g., Photoshop manufactured by Adobe).

The porous substrate is preferably composed of at least one selected from the group consisting of ceramic materials, metal materials, and polymer materials. The porous substrate is more preferably composed of a ceramic material. Preferred examples of the ceramic material include alumina, zirconia, titania, magnesia, spinel, calcia, cordierite, zeolite, mullite, ferrite, zinc oxide, silicon carbide, and any combination thereof. More preferred are alumina, zirconia, titania, and any combination thereof. Particularly preferred are alumina and zirconia. Most preferred is alumina. The use of such a porous ceramic material facilitates the formation of a highly-densified LDH-containing separator layer. Preferred examples of the metal material include aluminum and zinc. Preferred examples of the polymer material include polystyrene, polyether sulfone, polypropylene, epoxy resins, polyphenylene sulfide, hydrophilized fluororesins (e.g., poly (tetrafluoroethylene) (PTFE)), and any combination thereof. More preferably, a material having alkali resistance (i.e., resistance to an electrolytic solution of a battery) is appropriately selected from among the preferred materials described above.

The alkaline electrolytic solution may be any alkaline electrolytic solution that can be used in secondary batteries, and is preferably an aqueous alkali metal hydroxide solution. Each of the positive-electrode electrolytic solution 14 and the negative-electrode electrolytic solution 18 illustrated in FIG. 1A is preferably an aqueous alkali metal hydroxide solution. Examples of the alkali metal hydroxide include potassium hydroxide, sodium hydroxide, lithium hydroxide, and ammonium hydroxide. More preferred is potassium hydroxide. The electrolytic solution used in a zinc secondary battery may contain a zinc compound, such as zinc oxide or zinc hydroxide, for preventing the self-dissolution of a zinc alloy. As described above, the alkaline electrolytic solution may be in the form of a positive-electrode mixture and/or a negative-electrode mixture prepared through combination with the positive electrode and/or the negative electrode. Alternatively, the alkaline electrolytic solution may be formed into a gel for preventing the leakage of the solution. The gelling agent is preferably a polymer that swells through absorption of the solvent of the electrolytic solution. Examples of the gelling agent include polymers, such as poly(ethylene oxide), poly(vinyl alcohol), and polyacrylamide; and starch.

The container, which is preferably a resin container, accommodates at least the negative electrode and the alkaline electrolytic solution. In the nickel-zinc secondary battery 10 illustrated in FIGS. 1A and 1B, the container 22 may accommodate the positive electrode 12 and the positive-electrode electrolytic solution 14 as described above. In the zinc-air secondary battery 30 illustrated in FIG. 3A including the air electrode 32 serving as a positive electrode, the air electrode 32 (positive electrode) is not necessarily accommodated in the container 46 and may be disposed (e.g., in the form of a lid) to cover the opening 46*a* of the container 46. In any case, the container preferably has a structure exhibiting liquid tightness and gas tightness. The resin which may constitute the container preferably exhibits resistance to an alkali metal hydroxide, such as potassium hydroxide. More preferably, the resin is a polyolefin resin, an ABS resin, or a modified polyphenylene ether. Still more preferably, the resin is an ABS resin or a modified polyphenylene ether. The ceramic separator and/or the ceramic porous substrate is fixed to the container with the aforementioned adhesive.

Nickel-Zinc Secondary Battery

In a preferred embodiment, the present invention provides a nickel-zinc secondary battery. FIG. 1A is a schematic illustration of an exemplary nickel-zinc secondary battery according to this embodiment. FIG. 1A illustrates the initial state (i.e., discharge end state) of the nickel-zinc secondary battery before charging. It should be understood that the nickel-zinc battery according to this embodiment may be in a full charge state. As illustrated in FIG. 1A, the nickel-zinc secondary battery 10 according to this embodiment includes a container 22, and the container 22 includes a positive electrode 12, a positive-electrode electrolytic solution 14, a negative electrode 16, a negative-electrode electrolytic solution 18, and a ceramic separator 20. The positive electrode 12 contains nickel hydroxide and/or nickel oxyhydroxide. The positive-electrode electrolytic solution 14 is an alkaline electrolytic solution containing an alkali metal hydroxide. The positive electrode 12 is immersed in the positive-electrode electrolytic solution 14. The negative electrode 16 contains zinc and/or zinc oxide. The negative-electrode electrolytic solution 18 is an alkaline electrolytic solution containing an alkali metal hydroxide. The negative electrode 16 is immersed in the negative-electrode electrolytic solution 18. The container 22 accommodates the positive electrode 12, the positive-electrode electrolytic solution 14, the negative electrode 16, the negative-electrode electrolytic solution 18, the ceramic separator 20, and the porous substrate 28. The positive electrode 12 is not necessarily separated from the positive-electrode electrolytic solution 14, and the positive electrode 12 and the positive-electrode electrolytic solution 14 may be combined into a positive-electrode mixture. Similarly, the negative electrode 16 is not necessarily separated from the negative-electrode electrolytic solution 18, and the negative electrode 16 and the negative-electrode electrolytic solution 18 may be combined into a negative-electrode mixture. A positive-electrode collector 13 is optionally disposed in contact with the positive electrode 12, and a negative-electrode collector 17 is optionally disposed in contact with the negative electrode 16.

The separator 20 is disposed in the container 22 so as to separate a positive-electrode chamber 24 accommodating the positive electrode 12 and the positive-electrode electrolytic solution 14 from a negative-electrode chamber 26 accommodating the negative electrode 16 and the negative-electrode electrolytic solution 18. The porous substrate 28 is disposed on at least one surface (on the negative electrode 16 side in the illustrated example) of the separator 20. The separator 20 exhibits hydroxide ion conductivity and water impermeability. The water impermeability of the separator 20 indicates that the separator 20 has a density sufficiently high to prevent the permeation of water and is not a porous film or porous material having water permeability. Thus, this configuration is very effective for physically inhibiting the penetration of dendritic zinc (which may be formed during a charge mode of the battery) through the separator, to prevent the short circuit between the positive and negative electrodes. As illustrated in FIG. 1A, the separator 20 may be provided with a porous substrate 28. In any case, the hydroxide ion conductivity of the separator 20 leads to efficient migration of hydroxide ions between the positive-electrode electrolytic solution 14 and the negative-electrode electrolytic solution 18, resulting in charge/discharge reaction in the positive-electrode chamber 24 and the negative-electrode chamber 26. The following reactions occur at the positive-electrode chamber 24 and the negative-electrode chamber 26 during a charge mode of the battery (reverse reactions occur during a discharge mode).

Positive electrode: $Ni(OH)_2+OH^-\rightarrow NiOOH+H_2O+e^-$

Negative electrode: $ZnO+H_2O+2e^-\rightarrow Zn+2OH^-$

The aforementioned reaction at the negative electrode involves the following two reactions:

Dissolution of ZnO: $ZnO+H_2O+2OH^-\rightarrow Zn(OH)_4^{2-}$

Precipitation of Zn: $Zn(OH)_4^{2-}+2e^-\rightarrow Zn+4OH^-$

Figure 1B:
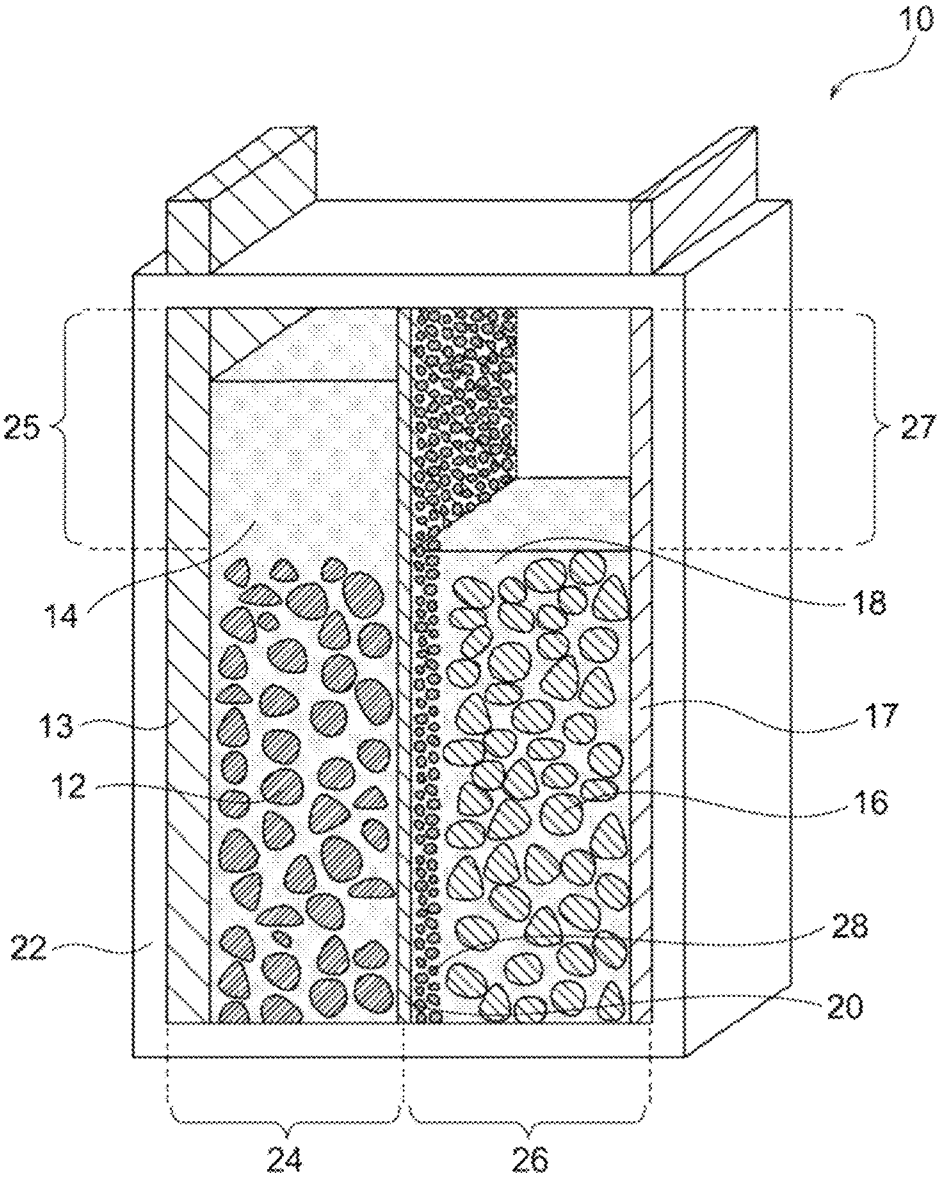
FIG. 1B illustrates the full charge state of the nickel-zinc battery of FIG. 1A.

The nickel-zinc secondary battery 10 preferably has an extra positive-electrode space 25 in the positive-electrode chamber 24. The extra positive-electrode space 25 has a volume that meets a variation in amount of water in association with the reaction at the positive electrode during charge/discharge of the battery. Also, the nickel-zinc secondary battery 10 preferably has an extra negative-electrode space 27 in the negative-electrode chamber 26. The extra negative-electrode space 27 has a volume that meets a variation in amount of water in association with the reaction at the negative electrode during charge/discharge of the battery. This configuration effectively prevents problems caused by a variation in amount of water in the positive-electrode chamber 24 and the negative-electrode chamber 26 (e.g., liquid leakage and deformation of the container due to a variation in internal pressure of the container), resulting in further improved reliability of the nickel-zinc secondary battery. As indicated by the aforementioned reaction formulae, the amount of water increases in the positive-electrode chamber 24 and decreases in the negative-electrode chamber 26 during a charge mode, whereas the amount of water decreases in the positive-electrode chamber 24 and increases in the negative-electrode chamber 26 during a discharge mode. Most traditional separators exhibit water permeability and thus allow water to pass therethrough freely. In contrast, the separator 20 used in this embodiment has high density and water impermeability. Hence, water cannot pass through the separator 20 freely, and an increase in amount of the electrolytic solution in the positive-electrode chamber 24 and/or the negative-electrode chamber 26 during charge/discharge of the battery may cause problems, such as liquid leakage. As illustrated in FIG. 1B, the positive-electrode chamber 24 has the extra positive-electrode space 25 having a volume that meets a variation in amount of water in association with the reaction at the positive electrode during charge/discharge of the battery, and thus the extra positive-electrode space 25 can buffer an increase in amount of the positive-electrode electrolytic solution 14 during a charge mode. Since the extra positive-electrode space 25 serves as a buffer even after full charge as illustrated in FIG. 1B, an increased amount of the positive-electrode electrolytic solution 14 can be reliably retained in the positive-electrode chamber 24 without causing overflow of the electrolytic solution. Similarly, the negative-electrode chamber 26 has the extra negative-electrode space 27 having a volume that meets a variation in amount of water in association with the reaction at the negative electrode during charge/discharge of the battery, and thus the extra negative-electrode space 27 can buffer an increase in amount of the negative-electrode electrolytic solution 18 during a discharge mode.

A variation in amount of water in the positive-electrode chamber 24 or the negative-electrode chamber 26 can be determined on the basis of the aforementioned reaction formulae. As indicated by the reaction formulae, the amount of $H_2O$ produced at the positive electrode 12 during a charge mode is twice the amount of $H_2O$ consumed at the negative electrode 16. Thus, the volume of the extra positive-electrode space 25 may be greater than that of the extra negative-electrode space 27. The volume of the extra positive-electrode space 25 is preferably determined such that the positive-electrode chamber 24 can be adapted to an increased amount of water and gasses (e.g., air originally contained in the positive-electrode chamber 24, and oxygen gas generated from the positive electrode 12 during overcharge) at an appropriate internal pressure. Although the volume of the extra negative-electrode space 27 may be equal to that of the extra positive-electrode space 25 as illustrated in FIG. 1A, the volume of the extra negative-electrode space 27 is preferably greater than the amount of water decreased during a charge mode in the case of the battery in a discharge end state. In any case, the volume of the extra negative-electrode space 27 may be smaller than that of the extra positive-electrode space 25 because a variation in amount of water in the negative-electrode chamber 26 is about half that in the positive-electrode chamber 24.

The nickel-zinc secondary battery 10 in a discharge end state preferably satisfies the following conditions: the extra positive-electrode space 25 has a volume greater than the amount of water that will increase in association with the reaction at the positive electrode during a charge mode; the extra positive-electrode space 25 is not preliminarily filled with the positive-electrode electrolytic solution 14; the extra negative-electrode space 27 has a volume greater than the amount of water that will decrease in association with the reaction at the negative electrode during the charge mode; and the extra negative-electrode space 27 is preliminarily filled with an amount of the negative-electrode electrolytic solution 18 that will decrease during the charge mode. In contrast, the nickel-zinc secondary battery 10 in a full charge state preferably satisfies the following conditions: the extra positive-electrode space 25 has a volume greater than the amount of water that will decrease in association with the reaction at the positive electrode during a discharge mode; the extra positive-electrode space 25 is preliminarily filled with an amount of the positive-electrode electrolytic solution 14 that will decrease during the discharge mode; the extra negative-electrode space 27 has a volume greater than the amount of water that will increase in association with the reaction at the negative electrode during the discharge mode;

and the extra negative-electrode space 27 is not preliminarily filled with the negative-electrode electrolytic solution 18.

Preferably, the extra positive-electrode space 25 is not filled with the positive electrode 12 and/or the extra negative-electrode space 27 is not filled with the negative electrode 16. More preferably, the extra positive-electrode space 25 and the extra negative-electrode space 27 are not filled with the positive electrode 12 and the negative electrode 16, respectively. The electrolytic solution may be drained due to a decrease in amount of water during charge/discharge of the battery in these extra spaces. Thus, the positive electrode 12 and the negative electrode 16 in these extra spaces are insufficiently involved in the charge/discharge reaction, resulting in low efficiency. If the extra positive-electrode space 25 and the extra negative-electrode space 27 are not filled with the positive electrode 12 and the negative electrode 16, respectively, the positive electrode 12 and the negative electrode 16 are effectively and reliably involved in the battery reaction.

As described above, a second separator (resin separator) composed of a hygroscopic resin or a liquid-retaining resin (e.g., non-woven fabric) may be disposed between the positive electrode 12 and the separator 20 and/or between the negative electrode 16 and the separator 20 such that the electrolytic solution can be retained in a reaction portion of the positive electrode and/or the negative electrode despite a reduction in amount of the electrolytic solution. Preferred examples of the hygroscopic resin or the liquid-retaining resin include polyolefin resins.

The positive electrode 12 contains nickel hydroxide and/or nickel oxyhydroxide. The nickel-zinc secondary battery in a discharge end state illustrated in FIG. 1A may involve the use of nickel hydroxide in the positive electrode 12. The nickel-zinc secondary battery in a full charge state illustrated in FIG. 1B may involve the use of nickel oxyhydroxide in the positive electrode 12. Nickel hydroxide or nickel oxyhydroxide is a common positive-electrode active material used in nickel-zinc secondary batteries and is typically in a particulate form. Nickel hydroxide or nickel oxyhydroxide may form a solid solution in the crystal lattice with an element other than nickel for an improvement in charge efficiency at high temperature. Examples of the element include zinc and cobalt. Nickel hydroxide or nickel oxyhydroxide may be mixed with a cobalt component. Examples of the cobalt component include particulate metallic cobalt and particulate cobalt oxide (e.g., cobalt monoxide). Particulate nickel hydroxide or nickel oxyhydroxide (which may form a solid solution with an element other than nickel) may be coated with a cobalt compound. Examples of the cobalt compound include cobalt monoxide, α-cobalt (II) hydroxide, β-cobalt (II) hydroxide, cobalt compounds having a valency of more than 2, and any combination thereof.

The positive electrode 12 may contain an additional element besides the nickel hydroxide compound and the element that may form a solid solution with the compound. Examples of the additional element include scandium (Sc), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), lutetium (Lu), hafnium (Hf), tantalum (Ta), tungsten (W), rhenium (Re), osmium (Os), iridium (Ir), platinum (Pt), gold (Au), mercury (Hg), and any combination thereof. Such an additional element may be contained in any form, such as elemental metal or a metal compound (e.g., oxide, hydroxide, halide, or carbonate). The amount of the additional element (in the form of elemental metal or metal compound) is preferably 0.5 to 20 parts by weight, more preferably 2 to 5 parts by weight, relative to 100 parts by weight of the nickel hydroxide compound.

The positive electrode 12 may be combined with the electrolytic solution to form a positive-electrode mixture. The positive-electrode mixture may contain the particulate nickel hydroxide compound, the electrolytic solution, and optionally an electrically conductive material (e.g., particulate carbon) or a binder.

The positive-electrode collector 13 is preferably disposed in contact with the positive electrode 12. As illustrated in FIG. 1A, the positive-electrode collector 13 may extend to the outside of the container 22 to serve as a positive-electrode terminal. Alternatively, the positive-electrode collector 13 may be connected to a separately provided positive-electrode terminal inside or outside of the container 22. Preferred examples of the positive-electrode collector 13 include nickel porous substrates, such as foamed nickel plates. In such a case, a paste containing an electrode active material (e.g., nickel hydroxide) may be evenly applied onto a nickel porous substrate and then dried, to prepare a positive electrode plate composed of the positive electrode 12 on the positive-electrode collector 13. After the drying step, the positive electrode plate (i.e., the positive electrode 12 on the positive-electrode collector 13) is preferably subjected to pressing for prevention of detachment of the electrode active material or an improvement in electrode density.

The negative electrode 16 contains zinc and/or zinc oxide. Zinc may be contained in any form exhibiting electrochemical activity suitable for the negative electrode; for example, in the form of metallic zinc, a zinc compound, or a zinc alloy. Preferred examples of the negative electrode material include zinc oxide, metallic zinc, and calcium zincate. More preferred is a mixture of metallic zinc and zinc oxide. The negative electrode 16 may be in the form of gel, or may be combined with the electrolytic solution to form a negative-electrode mixture. For example, the negative electrode in the form of gel may be readily prepared through addition of the electrolytic solution and a thickener to the negative-electrode active material. Examples of the thickener include poly(vinyl alcohol), poly(acrylic acid) salts, CMC, and alginic acid. Preferred is poly(acrylic acid), which exhibits high resistance to a strong alkali.

The zinc alloy may be a non-amalgamated zinc alloy; i.e., a zinc alloy not containing mercury or lead. For example, a zinc alloy containing 0.01 to 0.06 mass % indium, 0.005 to 0.02 mass % bismuth, and 0.0035 to 0.015 mass % aluminum is preferred because of the effect of reducing the generation of hydrogen gas. In particular, indium and bismuth are advantageous in improving discharge performance. The use of a zinc alloy in the negative electrode retards the self-dissolution in the alkaline electrolytic solution, to reduce the generation of hydrogen gas, resulting in improved safety.

The negative electrode material may be in any form, but is preferably in a powdery form. The powdery negative electrode material has a large surface area and is adapted to large current discharge. The negative electrode material (in the case of a zinc alloy) preferably has a mean particle size of 90 to 210 μm. The negative electrode material having such a mean particle size has a large surface area and thus is adapted to large current discharge. In addition, the negative electrode material can be evenly mixed with the electrolytic solution or a gelling agent, and is readily handled during the assembly of the battery.

The negative-electrode collector 17 is preferably disposed in contact with the negative electrode 16. As illustrated in FIG. 1A, the negative-electrode collector 17 may extend to the outside of the container 22 to serve as a negative-electrode terminal. Alternatively, the negative-electrode collector 17 may be connected to a separately provided negative-electrode terminal inside or outside of the container 22. Preferred examples of the negative-electrode collector 17 include punched copper sheets. In such a case, a mixture containing zinc oxide powder and/or zinc powder and an optional binder (e.g., particulate polytetrafluoroethylene) may be applied onto a punched copper sheet to prepare a negative electrode plate composed of the negative electrode 16 on the negative-electrode collector 17. After the drying of the mixture, the negative electrode plate (i.e., the negative electrode 16 on the negative-electrode collector 17) is preferably subjected to pressing for prevention of detachment of the electrode active material or an improvement in electrode density.

Figure 2:
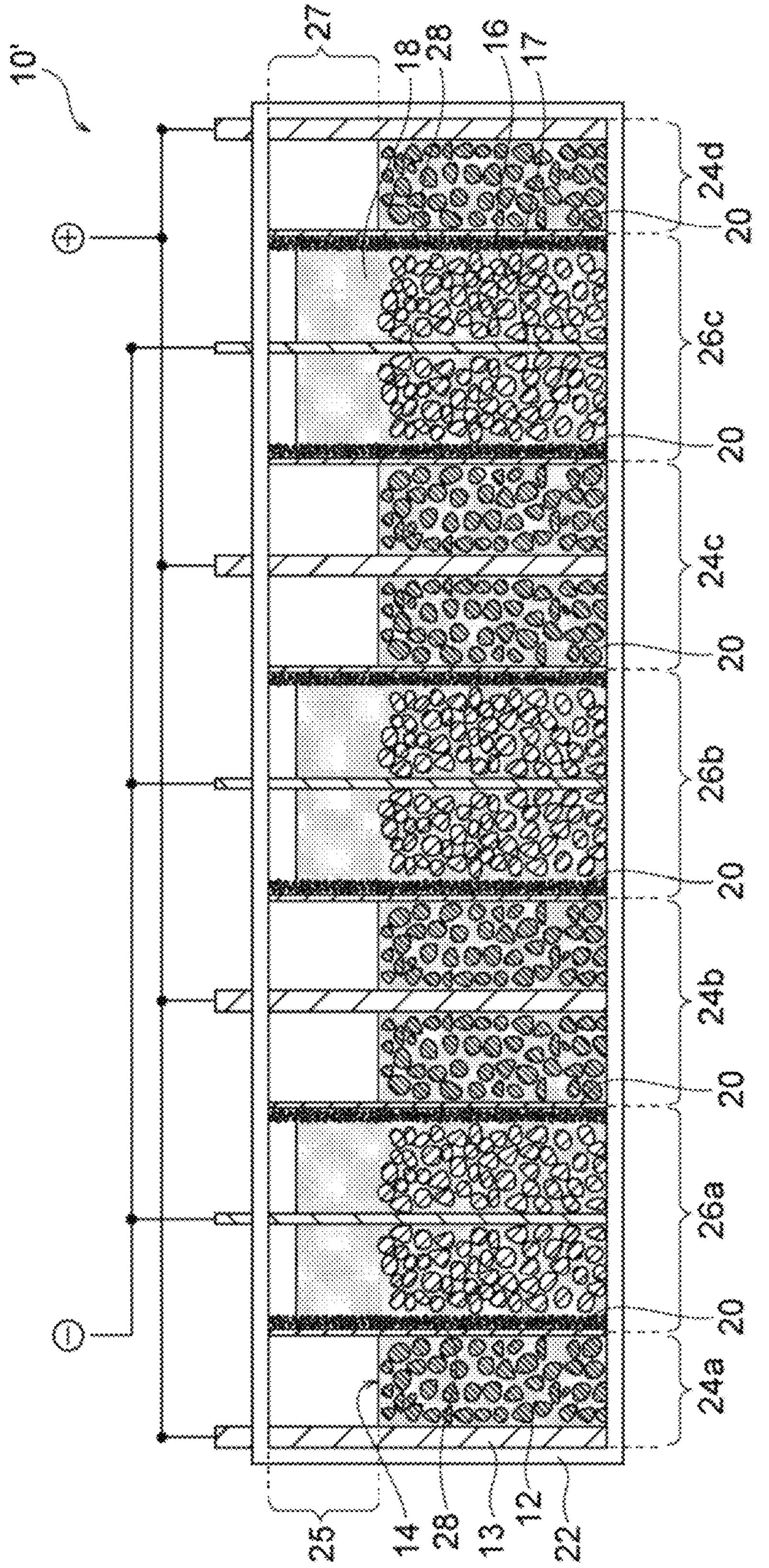
FIG. 2 is a schematic illustration of an exemplary parallelly stacked nickel-zinc battery according to the present invention, the battery being in a discharge end state.

The nickel-zinc battery 10 illustrated in FIGS. 1A and 1B includes one pair of the positive electrode 12 and the negative electrode 16. The nickel-zinc battery may include two or more pairs of the positive electrode 12 and the negative electrode 16 disposed in the hermetic container 22. Preferably, positive electrodes 12 and negative electrodes 16 are alternately disposed to form a parallelly stacked nickel-zinc battery. FIG. 2 illustrates an exemplary parallelly stacked nickel-zinc battery. The parallelly stacked nickel-zinc battery 10' of FIG. 2 includes, in sequence, a first positive-electrode chamber 24*a* (including a positive electrode 12 disposed on one surface of a positive-electrode collector 13); a separator 20; a first negative-electrode chamber 26*a* (including negative electrodes 16 disposed on the two surfaces of a negative-electrode collector 17); a separator 20; a second positive-electrode chamber 24*b* (including positive electrodes 12 disposed on the two surfaces of a positive-electrode collector 13); a separator 20; a second negative-electrode chamber 26*b* (including negative electrodes 16 disposed on the two surfaces of a negative-electrode collector 17); a separator 20; and a third positive-electrode chamber 24*c* (including a positive electrode 12 disposed on the two surfaces of a positive-electrode collector 13); a separator 20; a third negative-electrode chamber 26*c* (including negative electrodes 16 disposed on the two surfaces of a negative-electrode collector 17); a separator 20; and a fourth positive-electrode chamber 24*d* (including a positive electrode 12 disposed on one surface of a positive-electrode collector 13). The porous substrate 28 is disposed on at least one surface (on the negative electrode 16 side in the illustrated example) of each separator 20. This parallelly stacked nickel-zinc battery 10' corresponds to a configuration including six sets of the positive electrode; the separator; and the negative electrode. With reference to FIG. 2, the components in each of the positive-electrode chambers 24*a*, 24*b*, 24*c*, and 24*d* are the same as those in the positive-electrode chamber 24 illustrated in FIG. 1A, and these components are denoted by the same reference numerals as in FIG. 1A. Similarly, the components in each of the negative-electrode chambers 26*a*, 26*b*, and 26*c* are the same as those in the negative-electrode chamber 26 illustrated in FIG. 1A, and these components are denoted by the same reference numerals as in FIG. 1A. Thus, appropriate arrangement of a predetermined number of repeating assemblies (each including a positive-electrode chamber, a separator, and a negative-electrode chamber in sequence) can produce a parallelly stacked nickel-zinc battery including a predetermined number of positive and negative electrodes.

Zinc-Air Secondary Battery

Figure 3A:
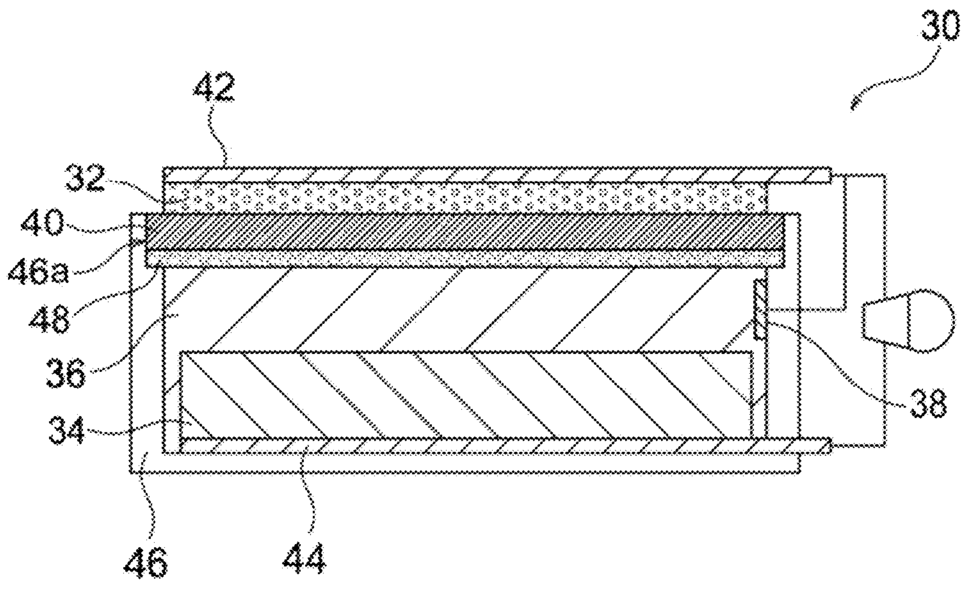
FIG. 3A is a schematic illustration of an exemplary zinc-air secondary battery according to an embodiment of the present invention.
Figure 3B:
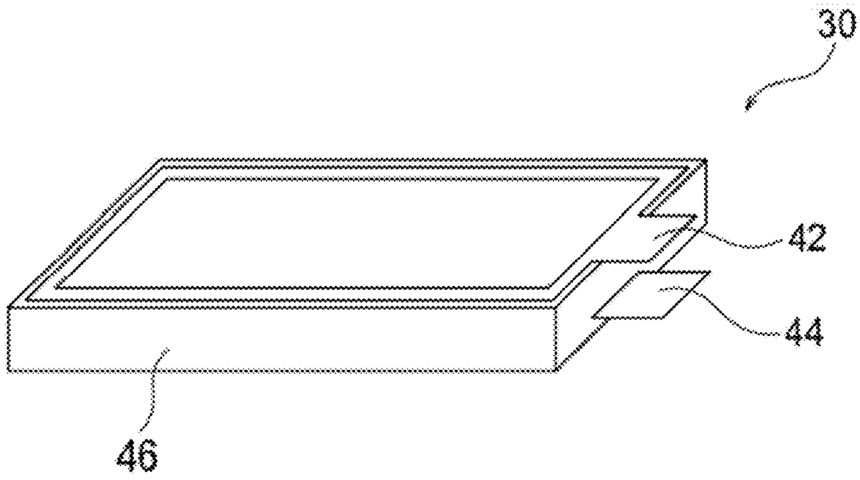
FIG. 3B is a perspective view of the zinc-air secondary battery of FIG. 3A.

In another preferred embodiment, the present invention provides a zinc-air secondary battery. FIGS. 3A and 3B are schematic illustrations of an exemplary zinc-air secondary battery according to this embodiment. As illustrated in FIGS. 3A and 3B, the zinc-air secondary battery 30 according to this embodiment includes an air electrode 32, a negative electrode 34, an alkaline electrolytic solution 36, a ceramic separator 40, a porous substrate 48, a container 46, and an optional third electrode 38. The air electrode 32 functions as a positive electrode. The negative electrode 34 contains zinc, a zinc alloy, and/or a zinc compound. The electrolytic solution 36 is an aqueous electrolyte in which the negative electrode 34 is immersed. The container 46 has an opening 48*a* and accommodates the negative electrode 34, the electrolytic solution 36, and the third electrode 38. The separator 40 is disposed to cover the opening 46*a* such that the separator 40 is in contact with the electrolytic solution 36 and defines a negative-electrode hermetic space with the container 46, whereby the air electrode 32 is separated from the electrolytic solution 36 by the separator 40 through which hydroxide ions pass. A positive-electrode collector 42 is optionally disposed in contact with the air electrode 32, and a negative-electrode collector 44 is optionally disposed in contact with the negative electrode 34. In such a case, the negative-electrode collector 44 is also accommodated in the container 46.

As described above, the separator 40 preferably exhibits hydroxide ion conductivity as well as water impermeability (preferably water impermeability and gas impermeability), and is typically in a membrane or layer form. The separator 40 is disposed to cover the opening 46*a* such that the separator 40 is in contact with the electrolytic solution 36 and defines the negative-electrode hermetic space with the container 46, whereby the air electrode 32 is separated from the electrolytic solution 36 by the separator 40 through which hydroxide ions pass. A porous substrate 48 is disposed on either or both of the surfaces of the separator 40, preferably on one surface (on the electrolytic solution side) of the separator 40. A liquid-retaining member composed of a hygroscopic resin or a liquid-retaining resin (e.g., non-woven fabric) may be disposed between the negative electrode 34 and the separator 40 such that the electrolytic solution 36 is always in contact with the negative electrode 34 and the separator 40 despite a reduction in amount of the electrolytic solution 36. The liquid-retaining member may also serve as a liquid-retaining member for the third electrode 38. Alternatively, another liquid-retaining member may be provided for the separator 40. The liquid-retaining member may be a commercially available battery separator. Preferred examples of the hygroscopic resin or the liquid-retaining resin include polyolefin resins.

The air electrode 32 may be any known air electrode used in metal-air batteries, such as zinc-air batteries. The air electrode 32 typically contains an air electrode catalyst, an electron conductive material, and an optional hydroxide-ion-conductive material. The air electrode 32 may contain an air electrode catalyst that also functions as an electron conductive material, and an optional hydroxide-ion-conductive material.

The air electrode catalyst may be any air electrode catalyst that functions as a positive electrode in a metal-air battery and can utilize oxygen as a positive-electrode active material. Preferred examples of the air electrode catalyst include carbonaceous materials having a redox catalytic function, such as graphite; metals having a redox catalytic function, such as platinum and nickel; and inorganic oxides having a redox catalytic function, such as perovskite oxides, manganese dioxide, nickel oxide, cobalt oxide, and spinel oxides. The air electrode catalyst may be in any form, but is preferably in a particulate form. The air electrode 32 may contain any amount of the air electrode catalyst. The amount of the air electrode catalyst is preferably 5 to 70 vol. %, more preferably 5 to 60 vol. %, still more preferably 5 to 50 vol. %, relative to the total amount of the air electrode 32.

The electron conductive material may be any material having electrical conductivity and capable of conducting electrons between the air electrode catalyst and the separator 40 (or an intermediate layer described below). Preferred examples of the electron conductive material include carbon black materials, such as Ketjen black, acetylene black, channel black, furnace black, lamp black, and thermal black; graphites, such as natural graphite (e.g., scaly graphite), artificial graphite, and expanded graphite; electrically conductive fibers, such as carbon fiber and metal fiber; powdery metals, such as copper, silver, nickel, and aluminum; organic electron conductive materials, such as polyphenylene derivatives; and any mixture of these materials. The electron conductive material may be in any form, such as a particulate form. The electron conductive material is preferably used in a form that provides a continuous phase (i.e., an electron conductive phase) in the air electrode 32 in the thickness direction. The electron conductive material may be a porous material. Alternatively, the electron conductive material may be a mixture or composite material with an air electrode catalyst (e.g., in the form of platinum on carbon), or may be the aforementioned air electrode catalyst that also functions as an electron conductive material (e.g., a perovskite compound containing a transition metal). The air electrode 32 may contain any amount of the electron conductive material. The amount of the electron conductive material is preferably 10 to 80 vol. %, more preferably 15 to 80 vol. %, still more preferably 20 to 80 vol. %, relative to the total amount of the air electrode 32.

The air electrode 32 may further contain a hydroxide-ion-conductive material as an optional component. If the separator 40 is composed of a hydroxide-ion-conductive inorganic solid electrolyte (i.e., dense ceramic material), the formation of the air electrode 32, which contains the air electrode catalyst and the electron conductive material (which are traditional components) and the hydroxide-ion-conductive material, on the separator 40 (optionally via an intermediate layer exhibiting hydroxide ion conductivity) can secure the desired characteristics of the dense ceramic separator 40, and can also reduce the reaction resistance of the air electrode in the metal-air battery. The incorporation of the air electrode catalyst, the electron conductive material, and the hydroxide-ion-conductive material into the air electrode 32 generates a three-phase interface including an electron conductive phase (electron conductive material) and a gaseous phase (air) at the interface between the air electrode 32 and the separator 40 (or the intermediate layer if applicable) and also in the air electrode 32. This leads to effective hydroxide ion conduction contributing to the battery reaction over a large surface area, resulting in reduced reaction resistance of the air electrode in the metal-air battery. The hydroxide-ion-conductive material may be any material through which hydroxide ions can permeate. The hydroxide-ion-conductive material may be any inorganic or organic material and may be in any form; for example, a layered double hydroxide having the aforementioned basic composition. The hydroxide-ion-conductive material may be in a particulate form, or may be in the form of a coating film that partially or substantially entirely covers the air electrode catalyst and the electron conductive material. Preferably, the hydroxide-ion-conductive material in the form of a coating film is not dense and has pores through which $O_2$ and $H_2O$ can pass from the outer surface of the air electrode 32 toward the interface between the air electrode 32 and the separator 40 (or the intermediate layer if applicable). The air electrode 32 may contain any amount of the hydroxide-ion-conductive material. The amount of the hydroxide-ion-conductive material is preferably 0 to 95 vol. %, more preferably 5 to 85 vol. %, still more preferably 10 to 80 vol. %, relative to the total amount of the air electrode 32.

The air electrode 32 may be formed by any process. For example, the air electrode 32 may be formed through the following procedure: an air electrode catalyst, an electron conductive material, and an optional hydroxide-ion-conductive material are wet-mixed with a solvent (e.g., ethanol), followed by drying and pulverization, and the mixture is mixed with a binder and the resultant fibrillary mixture was press-bonded to a collector. A laminate of the air electrode 32/the collector may be press-bonded to the separator 40 (or an intermediate layer if applicable) so that the air electrode 32 comes into contact with the separator 40. Alternatively, the air electrode 32 may be formed through the following procedure: an air electrode catalyst, an electron conductive material, and an optional hydroxide-ion-conductive material are wet-mixed with a solvent (e.g., ethanol), and the resultant slurry is applied to an intermediate layer and then dried. Thus, the air electrode 32 may contain a binder. The binder may be composed of any material, including a thermoplastic resin or a thermosetting resin.

The air electrode 32 is preferably in the form of a layer having a thickness of 5 to 200 μm, more preferably 5 to 100 μm, still more preferably 5 to 50 μm, particularly preferably 5 to 30 μm. Such a preferred thickness of the air electrode 32 containing the hydroxide-ion-conductive material leads to a reduction in gas diffusion resistance and an increase in area of the three-phase interface, resulting in further reduced reaction resistance of the air electrode.

The positive-electrode collector 42 is preferably disposed on the surface of the air electrode 32 remote from the separator 40. The positive-electrode collector 42 preferably exhibits gas permeability so that air can be fed to the air electrode 32. Preferred examples of the positive-electrode collector 42 include plates and meshes of metals, such as stainless steel, copper, and nickel; carbon paper; carbon cloth; and electron-conductive oxides. Particularly preferred is stainless steel mesh in view of corrosion resistance and gas permeability.

An intermediate layer may be disposed between the separator 40 and the air electrode 32. The intermediate layer may be composed of any material that improves adhesion between the separator 40 and the air electrode 32 and exhibits hydroxide ion conductivity. The intermediate layer may be composed of any organic or inorganic material and may have any known composition and structure. The intermediate layer preferably contains a polymer material and/or a ceramic material. In such a case, at least one of the polymer material and the ceramic material contained in the intermediate layer exhibits hydroxide ion conductivity. Two or more intermediate layers may be disposed, and these intermediate layers may be composed of the same material or different materials. Thus, the intermediate layer may have a single-layer structure or a multilayer structure. The intermediate layer has a thickness of preferably 1 to 200 μm, more preferably 1 to 100 μm, still more preferably 1 to 50 μm, particularly preferably 1 to 30 μm. Such a preferred thickness facilitates an improvement in adhesion between the separator 40 and the air electrode 32, and leads to a more effective reduction in battery resistance (in particular, the interface resistance between the air electrode and the separator) in the zinc-air secondary battery.

The negative electrode 34 contains zinc, a zinc alloy, and/or a zinc compound serving as a negative-electrode active material. The negative electrode 34 may be in any form; for example, in a particulate, platy, or gel form. The negative electrode 34 is preferably in a particulate or gel form in view of reaction rate. The particulate negative electrode is preferably composed of particles having a size of 30 to 350 μm. The gel-form negative electrode is preferably composed of a gel prepared through agitation of a mixture containing non-amalgamated zinc alloy powder having a particle size of 100 to 300 μm, an alkaline electrolytic solution, and a thickener (gelling agent). The zinc alloy may be an amalgamated or non-amalgamated alloy containing magnesium, aluminum, lithium, bismuth, indium, or lead in any amount that secures the desired performance of the negative-electrode active material. Preferred is a non-amalgamated zinc alloy free from silver and lead. More preferred is a zinc alloy containing aluminum, bismuth, indium, or any combination thereof. Still more preferred is a non-amalgamated zinc alloy containing 50 to 1,000 ppm bismuth, 100 to 1,000 ppm indium, and 10 to 100 ppm aluminum and/or calcium. Particularly preferred is a non-amalgamated zinc alloy containing 100 to 500 ppm bismuth, 300 to 700 ppm indium, and 20 to 50 ppm aluminum and/or calcium. Preferred examples of the zinc compound include zinc oxide.

The negative-electrode collector 44 is preferably disposed in contact with the negative electrode 34. As illustrated in FIGS. 3A and 3B, the negative-electrode collector 44 may extend to the outside of the container 46 to serve as a negative-electrode terminal. Alternatively, the negative-electrode collector 44 may be connected to a separately provided negative-electrode terminal inside or outside of the container 46. Preferred examples of the negative-electrode collector include plates and meshes of metals, such as stainless steel, copper (e.g., punched copper sheet), and nickel; carbon paper; and oxide electrical conductors. For example, a mixture containing zinc oxide powder and/or zinc powder and an optional binder (e.g., particulate polytetrafluoroethylene) may be applied onto a punched copper sheet to prepare a negative electrode plate composed of the negative electrode 34 on the negative-electrode collector 44. After the drying of the mixture, the negative electrode plate (i.e., the negative electrode 34 on the negative-electrode collector 44) is preferably subjected to pressing for prevention of detachment of the electrode active material or an improvement in electrode density.

The third electrode 38 may optionally be disposed so as to be in contact with the electrolytic solution 36, but not in contact with the negative electrode 34. In such a case, the third electrode 38 is connected to the air electrode 32 via an external circuit. With this configuration, hydrogen gas generated from the negative electrode 34 by the side reaction comes into contact with the third electrode 38 to produce water through the following reactions:

Third electrode: $H_2+2OH^-\rightarrow 2H_2O+2e^-$

Discharge at positive electrode: $O_2+2H_2O+4e^-\rightarrow 4OH^-$

In other words, hydrogen gas generated from the negative electrode 34 is absorbed by the third electrode 38, leading to self-discharge. This configuration prevents an increase in pressure in the negative-electrode hermetic space due to generation of hydrogen gas, and avoids problems caused by the increased pressure. This configuration also prevents water loss in the negative-electrode hermetic space through generation of water (which is lost through the aforementioned discharge reaction). Hydrogen gas generated from the negative electrode can be recycled to produce water in the negative-electrode hermetic space. Thus, the zinc-air secondary battery has a configuration very effective for preventing both the short circuit caused by dendritic zinc and the intrusion of carbon dioxide, and can address problems caused by the generation of hydrogen gas; i.e., the zinc-air secondary battery exhibits high reliability.

The third electrode 38 may be any electrode that is connected to the air electrode 32 via an external circuit and that can convert hydrogen gas ($H_2$) into water ($H_2O$) through the aforementioned reactions. The third electrode 38 preferably has an oxygen overvoltage higher than that of the air electrode 32. Preferably, the third electrode 38 is not involved in a common charge/discharge reaction. The third electrode 38 preferably contains platinum and/or a carbonaceous material, and more preferably contains a carbonaceous material. Preferred examples of the carbonaceous material include natural graphite, artificial graphite, hard carbon, soft carbon, carbon fiber, carbon nanotube, graphene, activated carbon, and any combination thereof. The third electrode 38 may be in any form, but is preferably in a form having a large specific surface area (e.g., in a mesh or particulate form). The third electrode 38 (preferably in a form having a large specific surface area) is more preferably coated with and/or disposed on a collector. The collector for the third electrode 38 may be in any form, but is preferably in the form of, for example, wire, punched metal, mesh, foamed metal, or any combination thereof. The collector for the third electrode 38 may be composed of the same material as the third electrode 38, or may be composed of a metal (e.g., nickel), an alloy, or any other electrically conductive material.

The third electrode 38, which is in contact with the electrolytic solution 36, is preferably disposed at a site that is not directly involved in a common charge/discharge reaction. In such a case, a liquid-retaining member composed of a hygroscopic resin or a liquid-retaining resin (e.g., non-woven fabric) is preferably disposed in the negative-electrode hermetic space so as to be in contact with the third electrode 38, such that the electrolytic solution 36 is always in contact with the third electrode 38 despite a reduction in amount of the electrolytic solution. The liquid-retaining member may be a commercially available battery separator. Preferred examples of the hygroscopic resin or the liquid-retaining resin include polyolefin resins. The third electrode 38 is not necessarily impregnated with a large amount of the electrolytic solution 36. The third electrode 38 moistened with a small amount of the electrolytic solution 36 exhibits a desired function. Thus, it is sufficient that the liquid-retaining member have an ability to retain such a small amount of the electrolytic solution.

LDH Separator with Porous Substrate

Figure 4:
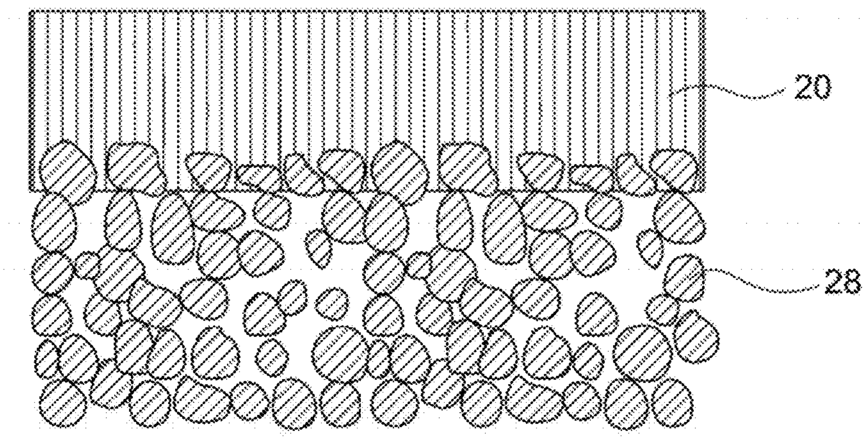
FIG. 4 is a schematic cross-sectional view of a separator provided with a porous substrate in an embodiment.
Figure 5:
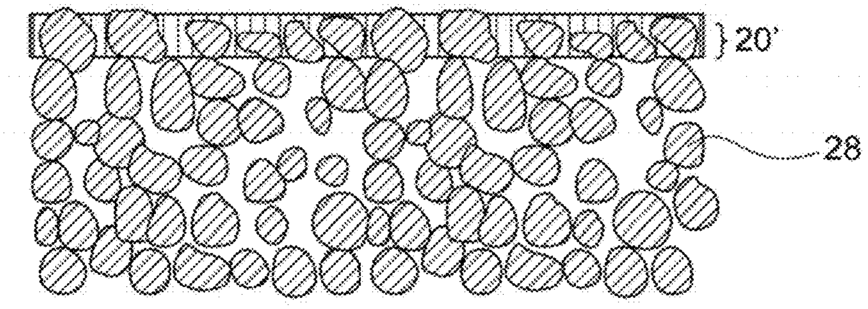
FIG. 5 is a schematic cross-sectional view of a separator provided with a porous substrate in another embodiment.

In the present invention, the inorganic solid electrode of the separator may be in a membrane or layer form as described above. Preferably, the inorganic solid electrode in a membrane or layer form is disposed on or in a porous substrate, to prepare a separator provided with the porous substrate. The particularly preferred separator provided with the porous substrate includes a porous substrate and a separator layer formed on and/or in the porous substrate. The separator layer contains the aforementioned layered double hydroxide (LDH). The separator layer preferably exhibits water impermeability and gas impermeability. Preferably, the porous substrate exhibits water permeability and gas permeability because of the presence of pores, and the separator layer composed of LDH exhibits high density and thus water impermeability and gas impermeability. The separator layer is preferably formed on the porous substrate. As illustrated in FIG. 4, it is preferred that the separator layer 20 in the form of an LDH dense membrane be formed on the porous substrate 28. In view of the characteristics of the porous substrate 28, LDH particles may be formed in pores in the surface and its vicinity as illustrated in FIG. 4. Alternatively, as illustrated in FIG. 5, LDH may be densely formed in the porous substrate 28 (e.g., in pores in the surface and its vicinity of the porous substrate 28) such that at least a portion of the porous substrate 28 forms the separator layer 20'. The separator illustrated in FIG. 5 has a structure prepared by removal of a portion corresponding to the membrane of the separator layer 20 of the separator illustrated in FIG. 4. The separator may have any other structure such that the separator layer is disposed parallel to the surface of the porous substrate 28. In any case, the separator layer composed of LDH is highly-densified and thus exhibits water impermeability and gas impermeability. Thus, the separator layer exhibits particular characteristics, i.e. hydroxide ion conductivity, water impermeability, and gas impermeability (i.e., the layer basically allows only hydroxide ions to pass therethrough).

The porous substrate is preferably one on which and/or in which the LDH-containing separator layer can be formed. The porous substrate may be composed of any material and may have any porous structure. In a typical embodiment, the LDH-containing separator layer is formed on and/or in the porous substrate. Alternatively, the LDH-containing separator layer may be formed on a non-porous substrate, and then the non-porous substrate may be modified into a porous form by any known process. The porous substrate preferably has a water-permeable porous structure because such a porous structure enables an electrolytic solution to come into contact with the separator layer in the case of the use of the layer as a separator for a battery.

The separator layer is formed on and/or in the porous substrate, preferably on the porous substrate. For example, the separator layer 20 formed on the porous substrate 28 as illustrated in FIG. 4 is in the form of an LDH dense membrane, and the LDH dense membrane is typically composed of LDH. The separator layer 20' formed in the porous substrate 28 as illustrated in FIG. 5 is typically composed of at least a portion of the porous substrate 28 and LDH because LDH is densely formed in the porous substrate 28 (typically in pores in the surface and its vicinity of the porous substrate 28). The separator layer 20' illustrated in FIG. 5 is prepared through removal of a membrane portion of the separator layer 20 illustrated in FIG. 4 by any known technique, such as polishing or machining.

The separator layer preferably exhibits water impermeability and gas impermeability. For example, if water is brought into contact with one surface of the separator layer at 25° C. for one week, water does not permeate the separator layer, and if helium gas is fed to one surface of the separator layer under application of a differential pressure of 0.5 atm, helium gas does not permeate the separator layer. The separator layer composed of LDH preferably has a density sufficient to exhibit water impermeability and gas impermeability. If the dense membrane has local and/or incidental defects exhibiting water permeability, the defects may be filled with an appropriate repairing agent (e.g., an epoxy resin) for ensuring water impermeability and gas impermeability. Such a repairing agent does not necessarily exhibit hydroxide ion conductivity. The surface of the separator layer (typically LDH dense membrane) has a porosity of preferably 20% or less, more preferably 15% or less, still more preferably 10% or less, particularly preferably 7% or less. A lower porosity of the surface of the separator layer indicates a higher density of the separator layer (typically LDH dense membrane). Such a high density is preferred. The surface porosity of the separator layer is used in the present invention because it can be readily measured by image processing described below and substantially reflects the internal porosity of the separator layer. Thus, if the surface of the separator layer is dense, the inside of the separator layer is also dense. In the present invention, the porosity of the surface of the separator layer can be measured by a method involving image processing as follows: 1) an electron microscopic (SEM) image of the surface of the separator layer is taken at a magnification of 10,000 or more; 2) the grayscale SEM image is read with image analysis software, such as Photoshop (manufactured by Adobe); 3) a monochromatic binary image is prepared with tools named [image], [color compensation], and [binarization] in this order and 4) the porosity (%) is calculated by dividing the number of pixels of the black area(s) by the number of all the pixels of the image. Preferably, the porosity is measured over a 6 μm×6 μm area of the surface of the separator layer by image processing. More preferably, the porosities in three 6 μm×6 μm areas selected at random are averaged for objective evaluation.

The layered double hydroxide is composed of an aggregation of platy particles (i.e., platy LDH particles). Preferably, these platy particles are oriented such that the tabular faces of the platy particles are substantially perpendicular to or oblique to the surface of the porous substrate (i.e., the substrate surface). In particular, this preferred embodiment is applied to the case where the separator layer 20 is disposed in the form of an LDH dense membrane on the porous substrate 28 as illustrated in FIG. 4. Alternatively, this embodiment may be applied to the case where LDH is densely formed in the porous substrate 28 (typically in pores in the surface and its vicinity of the porous substrate 28), and the separator layer 20' is composed of at least a portion of the porous substrate 28 as illustrated in FIG. 5.

Figure 6:
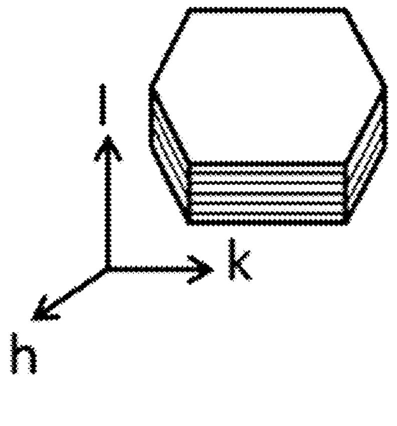
FIG. 6 is a schematic illustration of a platy particle of layered double hydroxide (LDH).

As illustrated in FIG. 6, the LDH crystal is in the form of a platy particle with a layered structure. The substantially perpendicular or oblique orientation described above is significantly beneficial for the LDH-containing separator layer (e.g., LDH dense membrane), because an oriented LDH-containing separator layer (e.g., an oriented LDH dense membrane) exhibits anisotropic hydroxide ion conductivity, i.e., hydroxide ion conductivity along the orientation of the platy LDH particles (i.e., parallel to layers of LDH) is much greater than that perpendicular to the orientation of the platy LDH particles in the oriented LDH membrane. In fact, the present applicant has revealed that the hydroxide ion conductivity (S/cm) along the orientation of LDH particles in an oriented LDH bulk body is an order of magnitude greater than the hydroxide ion conductivity (S/cm) perpendicular to the orientation of LDH particles. Thus, the substantially perpendicular or oblique orientation in the LDH-containing separator layer according to this embodiment fully or significantly leads to the anisotropic hydroxide ion conductivity of the oriented LDH to the thickness direction of the layer (i.e., the direction perpendicular to the surface of the separator layer or the surface of the porous substrate), whereby the conductivity in the thickness direction can be maximally or significantly increased. In addition, the LDH-containing separator layer has a layered structure and thus exhibits lower resistance than an LDH bulk block. The LDH-containing separator layer having such an orientation readily conducts hydroxide ions in the thickness direction of the layer. Because of its high density, the LDH-containing separator layer is very suitable for use as a separator that requires high conductivity across the thickness of the layer and high density.

In a particularly preferred embodiment, the LDH-containing separator layer (typically LDH dense membrane) is composed of the platy LDH particles highly oriented in the substantially perpendicular direction. If the platy LDH particles are highly orientated in the substantially perpendicular direction, the X-ray diffractometry of the surface of the separator layer shows substantially no peak of (003) plane or a peak of (003) plane smaller than that of (012) plane (note: this shall not apply to the case where the porous substrate shows a peak at the same angle as the peak of (012) plane of the platy LDH particles, because the peak of (012) plane of the platy LDH particles cannot be specified). This characteristic peak profile indicates that the platy LDH particles of the separator layer are oriented substantially perpendicular to (i.e, perpendicular to or nearly perpendicular to, and preferably perpendicular to) the separator layer. The peak of (003) plane is strongest among peaks observed by X-ray diffractometry of non-oriented LDH powder. In contrast, the oriented LDH-containing separator layer shows substantially no peak of (003) plane or the peak of (003) plane smaller than the peak of (012) plane because platy LDH particles are oriented substantially perpendicular to the separator layer. The reason for this is as follows: The c planes (00I) including the (003) plane (where I is 3 or 6) are parallel to the layers of platy LDH particles. If the platy LDH particles are oriented substantially perpendicular to the separator layer, the layers of platy LDH particles are also substantially perpendicular to the separator layer and thus the X-ray diffractometry of the surface of the separator layer shows no peak or very small peak of (00I) plane (where I is 3 or 6). The peak of (003) plane, if present, tends to be stronger than the peak of (006) plane, and the use of the peak of (003) plane facilitates determination of the substantially perpendicular orientation as compared with the use of the peak of (006) plane. Thus, the oriented LDH-containing separator layer preferably shows substantially no peak of (003) plane or shows the peak of (003) plane smaller than the peak of (012) plane, which indicates that the highly perpendicular orientation is achieved.

The separator layer has a thickness of preferably 100 μm or less, more preferably 75 μm or less, still more preferably 50 μm or less, particularly preferably 25 μm or less, most preferably 5 μm or less. Such a small thickness leads to a reduction in resistance of the separator. The separator layer is preferably formed as an LDH dense membrane on the porous substrate. In this case, the thickness of the separator layer corresponds to the thickness of the LDH dense membrane. If the separator layer is formed in the porous substrate, the thickness of the separator layer corresponds to the thickness of a composite layer composed of LDH and at least a portion of the porous substrate. If the separator layer is formed on and in the porous substrate, the thickness of the separator layer corresponds to the total thickness of the LDH dense membrane and the composite layer. The separator layer having the above thickness exhibits a low resistance suitable for use in, for example, a battery. The lower limit of the thickness of the oriented LDH membrane, which may vary with the intended use of the membrane, may be any value. In order to ensure the hardness desirable for use in a functional membrane, such as a separator, the thickness is preferably 1 μm or more, more preferably 2 μm or more.

The LDH separator provided with the porous substrate is produced through a method involving (1) providing a porous substrate, (2) immersing the porous substrate in an aqueous stock solution containing magnesium ions ($Mg^{2+}$) and aluminum ions ($Al^{3+}$) in a total concentration of 0.20 to 0.40 mol/L and further containing urea, and (3) hydrothermally treating the porous substrate in the aqueous stock solution, to form a separator layer containing a layered double hydroxide on and/or in the porous substrate.

(1) Provision of Porous Substrate

As described above, the porous substrate is preferably composed of at least one selected from the group consisting of ceramic materials, metal materials, and polymer materials. The porous substrate is more preferably composed of a ceramic material. Preferred examples of the ceramic material include alumina, zirconia, titania, magnesia, spinel, calcia, cordierite, zeolite, mullite, ferrite, zinc oxide, silicon carbide, and any combination thereof. More preferred are alumina, zirconia, titania, and any combination thereof. Particularly preferred are alumina and zirconia. Most preferred is alumina. The use of such a porous ceramic material facilitates the formation of a highly-densified LDH-containing separator layer. In the case of a ceramic porous substrate, the porous substrate is preferably subjected to, for example, ultrasonic cleaning or cleaning with ion-exchange water.

(2) Immersion in Aqueous Stock Solution

The porous substrate is then immersed in the aqueous stock solution in a desired direction (e.g., horizontally or perpendicularly). For horizontal retention of the porous substrate, the porous substrate may be hanged up in or suspended in a container of the aqueous stock solution, or placed on the bottom of the container. For example, the porous substrate may be immobilized and suspended in the stock solution and away from the bottom of the container. For perpendicular retention of the porous substrate, a jig may be disposed that can hold the porous substrate perpendicularly to the bottom of the container. In any case, a preferred configuration or arrangement is one that can achieve growth of LDH substantially perpendicular to the porous substrate (i.e., growth of LDH such that the tabular faces of platy LDH particles are substantially perpendicular to or oblique to the surface of the porous substrate). The aqueous stock solution contains magnesium ions ($Mg^{2+}$) and aluminum ions ($Al^{3+}$) in a specific total concentration and further contains urea. Urea is hydrolyzed into ammonia and raises the pH of the aqueous stock solution, and metal ions co-existing in the aqueous stock solution form hydroxides, to produce LDH. The hydrolysis of urea, which also generates carbon dioxide, can form LDH having carbonate ions as anions. The aqueous stock solution contains magnesium ions ($Mg^{2+}$) and aluminum ions ($Al^{3+}$) in a total concentration of preferably 0.20 to 0.40 mol/L, more preferably 0.22 to 0.38 mol/L, still more preferably 0.24 to 0.36 mol/L, particularly preferably 0.26 to 0.34 mol/L. Such a preferred concentration range facilitates the nucleation and the crystal growth in a well-balanced manner and can form a highly-oriented, highly-densified LDH membrane. At a low total concentration of magnesium ions and aluminum ions, the crystal growth presumably dominates over the nucleation, resulting in a decrease in the number of LDH particles and an increase in size of the LDH particles. At a high total concentration, the nucleation presumably dominates over the crystal growth, resulting in an increase in the number of LDH particles and a decrease in size of the LDH particles.

Preferably, the aqueous stock solution contains dissolved magnesium nitrate and aluminum nitrate; i.e., the aqueous stock solution contains nitrate ions besides magnesium ions and aluminum ions. In this case, the molar ratio of the urea to the nitrate ions ($NO_3^-$) (i.e., urea/$NO_3^-$) in the aqueous stock solution is preferably 2 to 6, more preferably 4 to 5.

(3) Formation of LDH-Containing Separator Layer Through Hydrothermal Treatment

The porous substrate is hydrothermally treated in the aqueous stock solution to form the LDH-containing separator layer on and/or in the porous substrate. The hydrothermal treatment is performed in a hermetic container at a temperature of preferably 60 to 150° C., more preferably 65 to 120° C., still more preferably 65 to 100° C., particularly preferably 70 to 90° C. The hydrothermal treatment temperature may have any upper limit without causing thermal deformation of the porous substrate (e.g., a polymer substrate). The temperature can be elevated at any rate in the hydrothermal treatment. The temperature elevation rate may be 10 to 200° C./h, and preferably 100 to 200° C./h, more preferably 100 to 150° C./h. The time for the hydrothermal treatment may be determined depending on the target density or thickness of the LDH membrane.

After the hydrothermal treatment, the porous substrate is removed from the hermetic container, and then preferably cleaned with ion-exchange water.

The LDH-containing separator layer in the LDH-containing composite material produced as described above is composed of densely assembled platy LDH particles that are oriented in the substantially perpendicular direction, which is beneficial for the conductivity. Thus, the LDH-containing separator layer is very suitable for use in a nickel-zinc battery that has suffered from growth of dendritic zinc which is an obstacle to practical use of this battery.

The above-described method may form LDH-containing separator layers on the two surfaces of the porous substrate. Thus, in order to modify the LDH-containing composite material into a form suitable for use as a separator, the LDH-containing separator layer on one surface of the porous substrate is preferably removed through mechanical scraping after the formation of the separator layers. Alternatively, it is desirable to take a measure to prevent formation of the LDH-containing separator layer on one surface of the porous substrate in advance.

EXAMPLES

The present invention will now be described in more detail by way of Examples.

Example 1: Preparation and Evaluation of LDH Separator with Porous Substrate (1) Preparation of Porous Substrate Boehmite (DISPAL 18N4-80, manufactured by Sasol Limited), methyl cellulose, and ion-exchange water were weighed in proportions by mass of 10:1:5, and were then kneaded together. The kneaded product was subjected to extrusion molding with a hand press into a plate having a size sufficiently exceeding 5 cm×8 cm and a thickness of 0.5 cm. The resultant green body was dried at 80° C. for 12 hours and then fired at 1,150° C. for three hours, to prepare an alumina porous substrate. The porous substrate was cut into a piece of 5 cm×8 cm.

Figure 7:
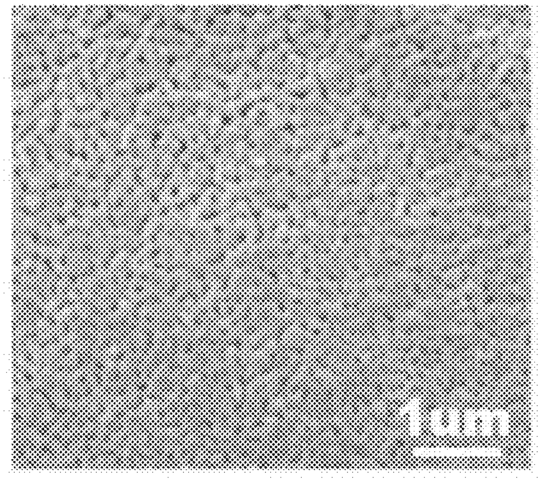
FIG. 7 is a SEM image of the surface of a porous alumina substrate prepared in Example 1.

The porosity at the surface of the resultant porous substrate was determined by a method involving image processing. The porosity was 24.6%. The porosity was determined as follows: 1) a scanning electron microscopic (SEM) image of the surface microstructure of the porous substrate was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared with tools named [image], [color compensation], and [binarization] in this order; and 4) the porosity (%) was determined by dividing the number of pixels of the black areas by the number of all the pixels of the image. The porosity was determined over a 6 μm×6 μm area of the surface of the porous substrate. FIG. 7 illustrates the SEM image of the surface of the porous substrate.

The average pore size of the porous substrate was about 0.1 μm. In the present invention, the average pore size was determined by measuring the largest length of each pore in a scanning electron microscopic (SEM) image of the surface of the porous substrate. The magnification of the scanning electron microscopic (SEM) image used in this measurement was 20,000. All the measured pore sizes were listed in order of size to calculate the average, from which the subsequent 15 larger sizes and the subsequent 15 smaller sizes, i.e., 30 sizes in total, were selected in one field of view. The pore sizes were measured by, for example, a length-measuring function of SEM software.

(2) Cleaning of Porous Substrate

The resultant porous substrate was ultrasonically cleaned in acetone for five minutes, in ethanol for two minutes, and then in ion-exchange water for one minute.

(3) Preparation of Aqueous Stock Solution

Magnesium nitrate hexahydrate ($Mg(NO_3)_2.6H_2O$, manufactured by KANTO CHEMICAL Co., Inc.), aluminum nitrate nonahydrate ($Al(NO_3)_3.9H_2O$, manufactured by KANTO CHEMICAL Co., Inc.), and urea ($(NH_2)_2CO$, manufactured by Sigma-Aldrich Corporation) were provided as raw materials for an aqueous stock solution. Magnesium nitrate hexahydrate and aluminum nitrate nonahydrate were weighed and placed in a beaker, and then ion-exchange water was added to the beaker to achieve a total volume of 600 mL, a ratio of the cations ($Mg^{2+}/Al^{3+}$) of 2, and a molar concentration of the total metal ions (i.e., $Mg^{2+}$ and $Al^{3+}$) of 0.320 mol/L. The resultant solution was agitated and urea was then added to the solution. The added urea was weighed in advance to give a urea/$NO_3^-$ ratio of 4. The resultant solution was further agitated to prepare an aqueous stock solution.

(4) Formation of Membrane by Hydrothermal Treatment

The aqueous stock solution prepared in the above procedure (3) and the porous substrate cleaned in the above procedure (2) were enclosed together in a hermetic Teflon (registered trademark) container (with an internal volume of 800 mL and a stainless steel jacket). The porous substrate was horizontally suspended and away from the bottom of the hermetic Teflon (registered trademark) container such that the opposite surfaces of the porous substrate came into contact with the aqueous stock solution. Thereafter, the porous substrate was subjected to hydrothermal treatment at a hydrothermal temperature of 70° C. for 168 hours (7 days), to form oriented layered double hydroxide membranes (separator layers) on the surfaces of the substrate. After the elapse of a predetermined period of time, the porous substrate was removed from the hermetic container, cleaned with ion-exchange water, and then dried at 70° C. for 10 hours, to form a dense membrane of the layered double hydroxide (LDH) on the porous substrate (hereinafter the dense membrane will be referred to as "membrane sample"). The thickness of the membrane sample was about 1.5 μm. A Layered double hydroxide-containing composite material sample (hereinafter referred to as "composite material sample") was thereby prepared. LDH membranes were formed on the opposite surfaces of the porous substrate. In order to use the composite material as a separator, the LDH membrane on one surface of the porous substrate was mechanically removed.

(5) Evaluations (5a) Identification of Membrane Sample

Figure 8:
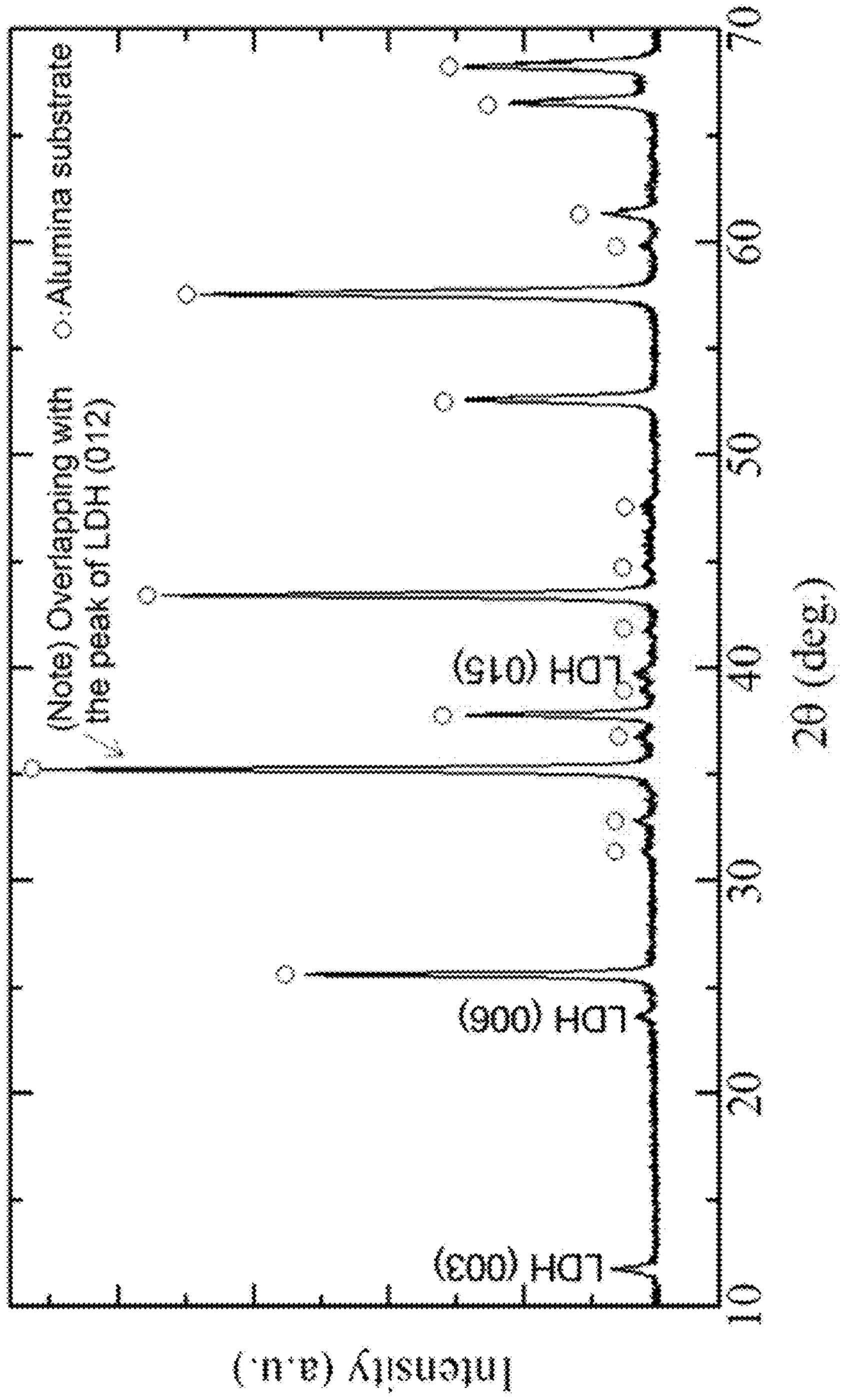
FIG. 8 is an XRD profile of a crystalline phase of a sample in Example 1.

A crystalline phase of a membrane sample was analyzed with an X-ray diffractometer (RINT-TTR III, manufactured by Rigaku Corporation) at a voltage of 50 kV, a current of 300 mA, and a measuring range of 10° to 70°. The resultant XRD profile is illustrated in FIG. 8. The XRD profile was compared with the diffraction peaks of a layered double hydroxide (or a hydrotalcite compound) described in JCPDS card No. 35-0964 for identification of the membrane sample. The membrane sample was identified as a layered double hydroxide (LDH, or a hydrotalcite compound). As shown in the XRD profile of FIG. 8, peaks derived from alumina in the porous substrate on which the membrane sample was formed (i.e., the peaks marked with a circle) were also observed.

(5b) Observation of Microstructure

Figure 9:
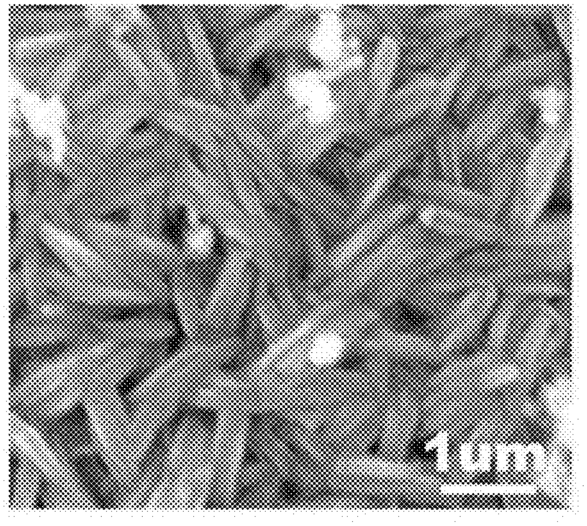
FIG. 9 is a SEM image of a surface microstructure of a sample membrane in Example 1.

The surface microstructure of the membrane sample was observed with a scanning electron microscope (SEM; JSM-6610LV, manufactured by JEOL Ltd.) at an acceleration voltage of 10 to 20 kV. FIG. 9 illustrates the resultant SEM image (i.e., a secondary electron image) of the surface microstructure of the membrane sample.

Figure 10:
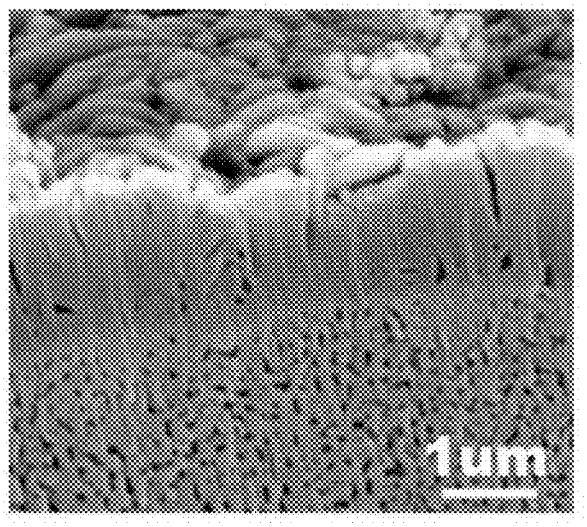
FIG. 10 is a SEM image of a microstructure at a polished cross-sectional surface of a composite material sample in Example 1.

A cross-section of the composite material sample was subjected to CP polishing, and the microstructure of the polished cross-section was observed with a scanning electron microscope (SEM) at an acceleration voltage of 10 to 20 kV. FIG. 10 illustrates the resultant SEM image of the microstructure of the polished cross-section of the composite material sample.

(5c) Measurement of Porosity

The porosity at the surface of the membrane sample was determined by a method involving image processing. Specifically, the porosity was determined as follows: 1) a scanning electron microscopic (SEM) image of the surface microstructure of the membrane was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared with tools named [image], [color compensation], and [binarization] in this order; and 4) the porosity (%) was determined by dividing the number of pixels of the black areas by the number of all the pixels of the image. The porosity was determined over a 6 μm×6 μm area of the surface of the membrane. The porosity was 19.0%. This porosity was used to calculate the density D (hereinafter referred to as "membrane surface density") of the surface of the membrane by the expression: D=100%−(the porosity at the surface of the membrane). The density D was 81.0%.

The porosity at the polished cross-section of the membrane sample was also determined. The porosity was determined as in the above procedure except for taking an electron microscopic (SEM) image of the polished cross-section along the thickness of the membrane at a magnification of 10,000 or more (through the above procedure (5b)). The determination of the porosity was performed on the cross-section of the membrane portion in the oriented membrane sample. The porosity at the polished cross-section of the membrane sample was 3.5% on average (i.e., the average porosity of three polished cross-sections). The results demonstrate a significantly high density of the membrane formed on the porous substrate.

(5d) Evaluation of Density I

Figure 11A:
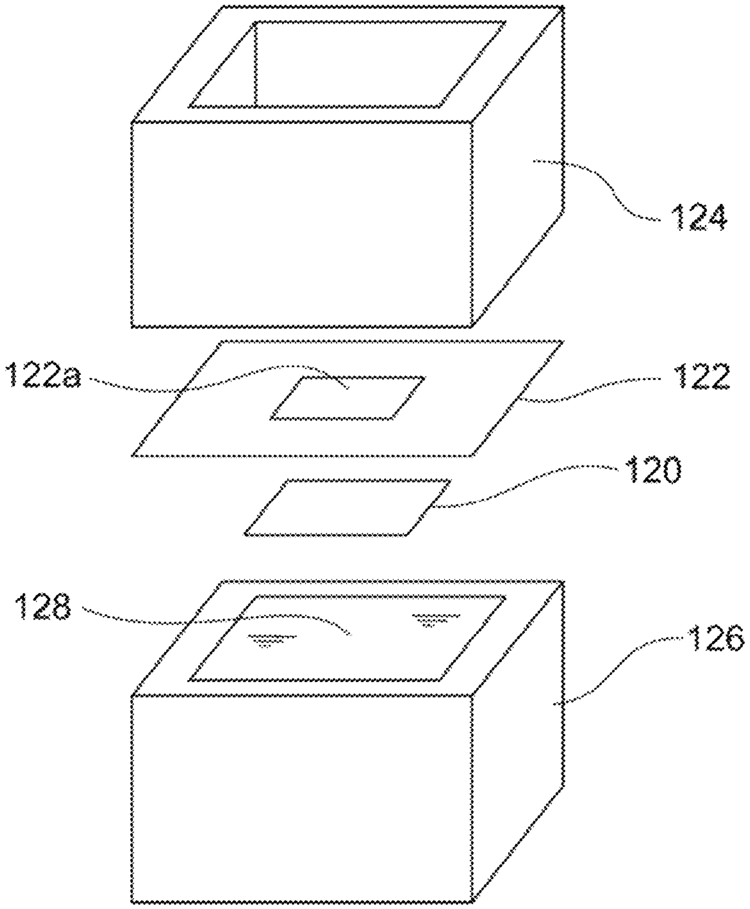
FIG. 11A is an exploded perspective view of a system for evaluating and measuring density in Example 1.
Figure 11B:
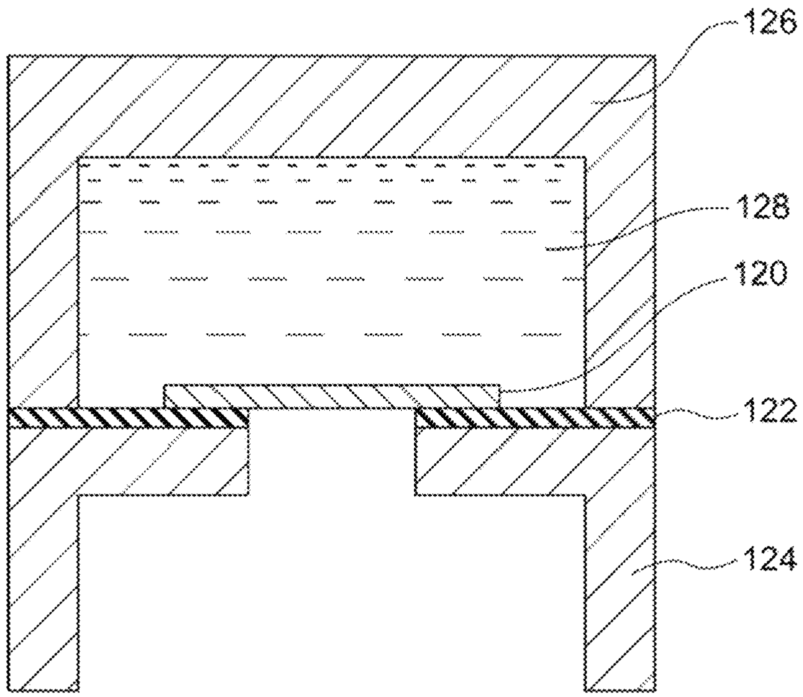
FIG. 11B a schematic cross-sectional view of a system for evaluating and measuring density in Example 1.

A density evaluation test was performed on the membrane sample for determining whether the sample has high density and thus water impermeability. With reference to FIG. 11A, a silicone rubber 122 having a central opening 122*a* (0.5 cm×0.5 cm) was bonded to the membrane sample of composite material sample 120 prepared in (1) above (cut into a piece of 1 cm×1 cm), and the resultant laminate was disposed between two acrylic units 124 and 126 and bonded to these acrylic units. The acrylic unit 124 disposed on the silicone rubber 122 has no bottom, and thus the silicone rubber 122 is bonded to the acrylic unit 124 such that the opening 122*a* is exposed. The acrylic unit 126 disposed on the porous substrate of composite material sample 120 has a bottom and contains ion-exchange water 128. In this case, Al and/or Mg may be dissolved in the ion-exchange water. Thus, these components are arranged to form an assembly such that the ion-exchange water 128 comes into contact with the porous substrate of composite material sample 120 if the assembly is inverted upside down. After formation of the assembly, the total weight thereof was measured. It should be noted the unit 126 has a closed vent (not shown) and the vent is opened after inversion of the assembly. As illustrated in FIG. 11B, the assembly was inverted and left for one week at 25° C., and then the total weight thereof was measured again. Before measurement of the weight of the assembly, water droplets on the inner side(s) of the acrylic unit 124 were wiped off, if any. The density of the membrane sample was evaluated on the basis of the difference between the total weights of the assembly before and after the inversion. No change in weight of the ion-exchange water was observed even after the one-week test at 25° C. The results demonstrate that the membrane sample (i.e., functional membrane) exhibits high density and thus water impermeability.

(5e) Evaluation of Density II

Figure 12A:
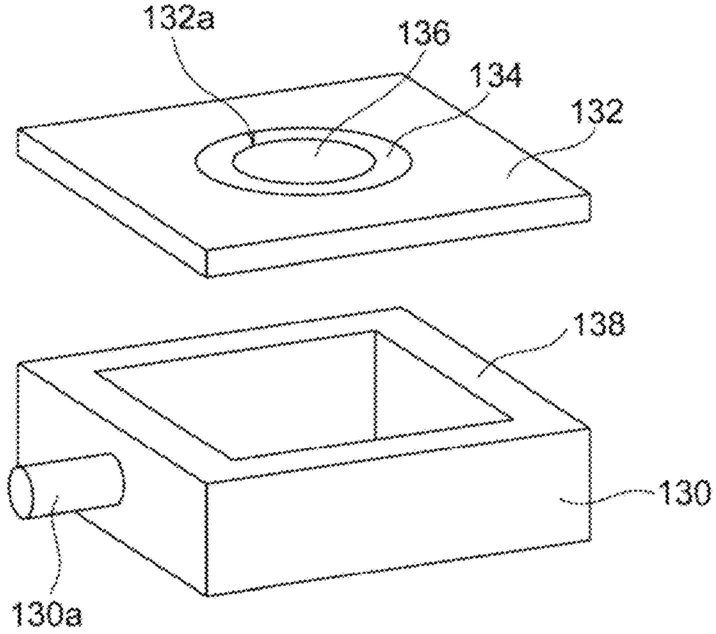
FIG. 12A is an exploded perspective view of a hermetic container used in density evaluation test II in Example 1.
Figure 12B:
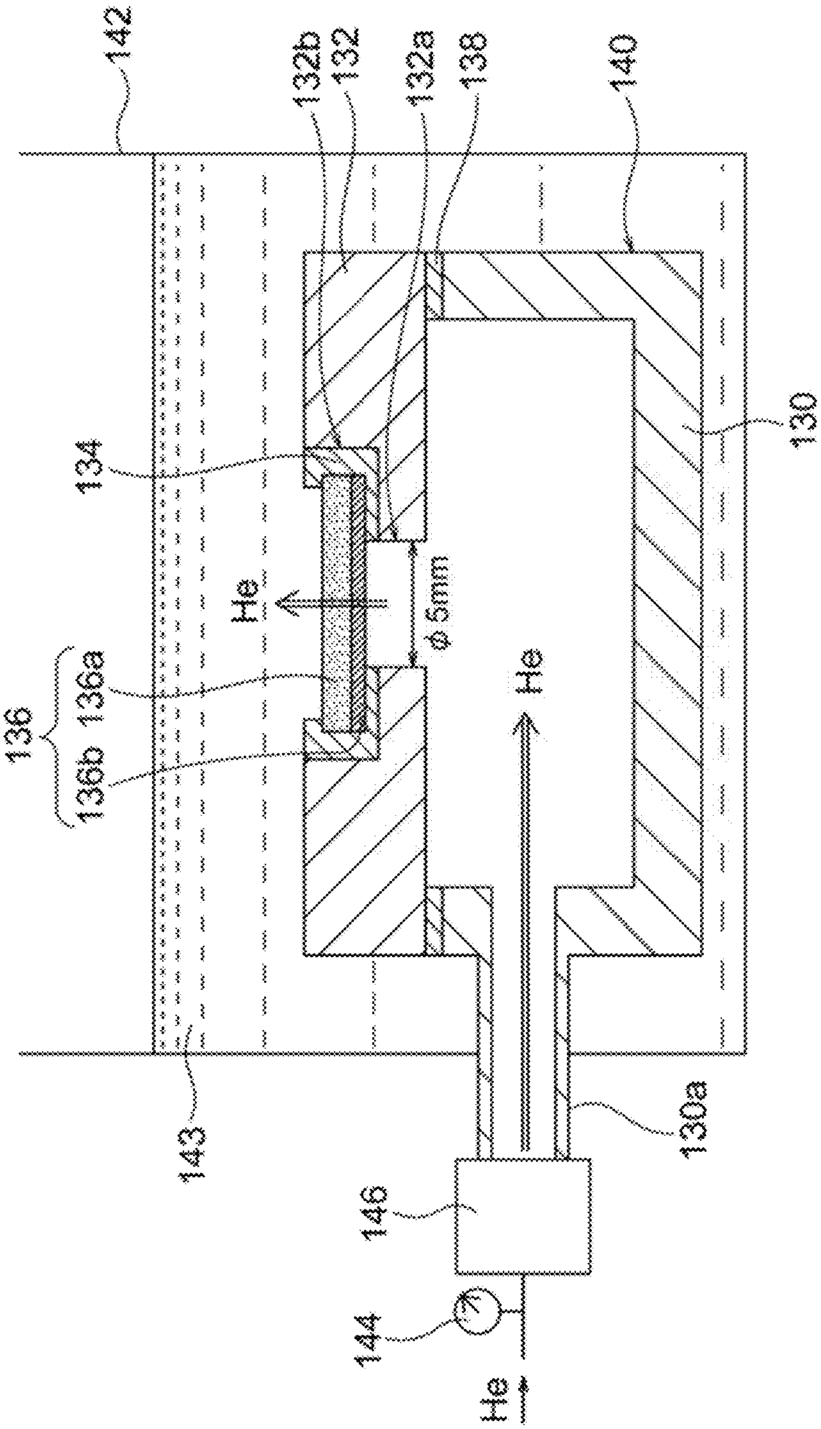
FIG. 12B is a schematic cross-sectional view of a system used in density evaluation test II in Example 1.

A density evaluation test was performed on the membrane sample for determining whether the sample has high density and thus gas impermeability. As illustrated in FIGS. 12A and 12B, an acrylic container 130 and an alumina jig 132 were provided. The container 130 has no lid, and the jig 132 has a shape and a size such that it serves as a lid for the container 130. The acrylic container 130 has a gas inlet 130*a* for feeding a gas into the container 130. The alumina jig 132 has an opening 132*a* having a diameter of 5 mm, and a dent 132*b* provided around the opening 132*a* for supporting the membrane sample. An epoxy adhesive 134 was applied to the dent 132*b* of the alumina jig 132, and a membrane sample 1386*b* of a composite material sample 136 was placed on the dent 132*b* and gas- and liquid-tightly bonded to the alumina jig 132. The alumina jig 132 provided with the composite material sample 136 was gas- and liquid-tightly bonded to the upper edge of the acrylic container 130 with a silicone adhesive 138 so as to completely cover the opening of the acrylic container 130, to prepare a hermetic container 140 for evaluation. The hermetic container 140 was placed in a water bath 142, and the gas inlet 130*a* of the acrylic container 130 was connected to a pressure gauge 144 and a flowmeter 146 so as to allow helium gas to be fed into the acrylic container 130. Water 143 was poured into the water bath 142 such that the hermetic container 140 was completely submerged in the water. The hermetic container 140 was ensured to have gas tightness and liquid tightness. The membrane sample 1368*b* of the composite material sample 136 was exposed to the inner space of the hermetic container 140, and the porous substrate 136*a* of the composite material sample 136 was in contact with the water in the water bath 142. Helium gas was fed into the hermetic container 140 through the gas inlet 130*a* of the acrylic container 130. The pressure gauge 144 and the flowmeter 146 were monitored to achieve a differential pressure of 0.5 atm at the membrane sample 136*b* (i.e., the pressure applied to the surface in contact with helium gas was higher by 0.5 atm than water pressure applied to the opposite surface), to determine the presence of helium gas bubbles in the water caused by permeation of helium gas through the composite material sample 136. No helium gas bubbles were observed. The results demonstrate that the membrane sample 136*b* has high density and thus gas impermeability.

Example 2: Production and Evaluation of Nickel-Zinc Secondary Battery (1) Preparation of Separator with Porous Substrate A separator provided with a porous substrate (LDH membrane on alumina substrate) (size: 5 cm×8 cm) was prepared as in Example 1.

(2) Preparation of Positive Electrode Plate

Particulate nickel hydroxide containing zinc and cobalt in the form of solid solution was prepared. The particulate nickel hydroxide was coated with cobalt hydroxide to yield a positive-electrode active material. The positive-electrode active material was mixed with a 2% aqueous carboxymethyl cellulose solution to prepare a paste. The paste was evenly applied to a collector composed of a nickel porous substrate having a porosity of about 95% and dried so that the porosity of the positive-electrode active material was 50% to prepare a positive electrode plate having a region of 5 cm×5 cm coated with the active material. The amount of coating was adjusted so that the active material contained particulate nickel hydroxide corresponding to 4 Ah.

(3) Preparation of Negative Electrode Plate

A mixture of powdery zinc oxide (80 parts by weight), powdery zinc (20 parts by weight), and particulate polytetrafluoroethylene (3 parts by weight) was applied onto a collector composed of punched copper sheet, to prepare a negative electrode plate having a porosity of about 50% and a region of 5 cm×5 cm coated with the active material. The amount of coating was adjusted so that the active material contained powdery zinc oxide corresponding to a positive electrode plate capacity of 4 Ah.

(4) Assembly of Battery

The positive electrode plate, the negative electrode plate, and the separator provided with the porous substrate were assembled as described below into a nickel-zinc secondary battery illustrated in FIG. 1A.

A rectangular parallelepiped casing composed of ABS resin and having no lid was provided. The separator provided with the porous substrate (LDH membrane on alumina substrate) was placed near the center of the casing, and three edges of the separator were fixed to the inner wall of the casing with an epoxy resin adhesive (EP008, manufactured by CEMEDINE Co., Ltd.). The positive electrode plate and the negative electrode plate were placed in a positive-electrode chamber and a negative-electrode chamber, respectively. The positive electrode plate and the negative electrode plate were disposed so that a positive-electrode collector and a negative-electrode collector came into contact with the inner wall of the casing. A 6 mol/L aqueous KOH solution, serving as an electrolytic solution, was injected into the positive-electrode chamber in an amount such that the region coated with the positive-electrode active material was completely submerged in the solution. The liquid level of the electrolytic solution in the positive-electrode chamber was about 5.2 cm from the bottom of the casing. A 6 mol/L aqueous KOH solution, serving as an electrolytic solution, was injected into the negative-electrode chamber in an amount such that the region coated with the negative-electrode active material was completely submerged in the solution. The amount of the electrolytic solution was adjusted so as to meet the amount of water that will decrease during a charge mode. The liquid level of the electrolytic solution in the negative-electrode chamber was about 6.5 cm from the bottom of the casing. The terminals of the positive-electrode collector and the negative-electrode collector were connected to external terminals provided at the top of the casing. A lid for the casing was fixed to the casing by thermal fusion to hermetically seal the battery casing. The nickel-zinc secondary battery was thereby produced. In the battery, the separator had a width of 5 cm and a height of 8 cm, and the region of the positive or negative electrode plates coated with the active material had a width of 5 cm and a height of 5 cm. Thus, an upper space of the positive-electrode or negative electrode chamber corresponding to a difference in height of 3 cm was respectively an extra positive-electrode or negative-electrode space.

(5) Evaluation

The resultant nickel-zinc secondary battery was subjected to constant-current charging for 10 hours (design capacity: 4 Ah, current: 0.4 mA corresponding to 0.1 C). Neither the deformation of the casing nor the leakage of the electrolytic solution was observed after the charging. The liquid level of the electrolytic solution was observed after the charging. The liquid level of the electrolytic solution in the positive-electrode chamber was about 7.5 cm from the bottom of the casing, and the liquid level of the electrolytic solution in the negative-electrode chamber was about 5.2 cm from the bottom of the casing. Although the amount of the electrolytic solution increased in the positive-electrode chamber and the amount of the electrolytic solution decreased in the negative-electrode chamber through the charging, the region coated with the negative-electrode active material was immersed in a sufficient amount of the electrolytic solution. Thus, the electrolytic solution was retained in the casing in an amount sufficient for the charge/discharge reaction of the coated positive-electrode active material and negative-electrode active material through charge/discharge of the battery. The separator provided with the porous substrate was successfully bonded to the rectangular parallelepiped casing composed of ABS resin.

Example 3: Evaluation of Properties of Batteries Including Various Porous Substrates (1) Preparation of Separator with Porous Substrate Various alumina porous substrates having dimensions of 2 cm by 3.2 cm, thicknesses of 100 to 2,000 μm, and porosities of 10 to 90% were prepared as in Example 1 (1) except that production conditions (e.g., proportions of raw materials, molding pressure, thickness, and firing temperature) were appropriately varied. The porosity of each porous substrate was determined as in Example 1 (1). For the sake of convenience, the resultant value was rounded to the nearest 10 and used as an index for evaluation.

An LDH separator provided with a porous substrate (dimensions: 2 cm by 3.2 cm) was prepared as in Example 2 (2) to (4) through washing of the porous substrate, preparation of an aqueous stock solution, and formation of a membrane by hydrothermal treatment, except that production conditions were appropriately varied.

(2) Preparation of Positive Electrode Plate

Both surfaces of a collector were coated with a positive-electrode active material to prepare a positive electrode plate (two positive electrode plates were prepared; two active-material-coated surfaces in total). Separately, one surface of a collector was coated with the positive-electrode active material to prepare a positive electrode plate (two positive electrode plates were prepared; four active-material-coated surfaces in total). Each of these positive electrode plates was prepared as described below in detail. Particulate nickel hydroxide containing zinc and cobalt in the form of solid solution was prepared. The particulate nickel hydroxide was coated with cobalt hydroxide to yield a positive-electrode active material. The positive-electrode active material was mixed with a 2% aqueous carboxymethyl cellulose solution to prepare a paste. The paste was evenly applied to a collector (thickness: 0.5 mm) composed of a nickel porous substrate having a porosity of about 95% and dried so that the porosity of the positive-electrode active material was 50% to prepare a positive electrode plate having a region of 2 cm by 2 cm (on one or both surfaces) coated with the active material. The positive electrode plate prepared through coating of both surfaces of the collector with the positive-electrode active material had a thickness of 1.8 mm; i.e., the thickness of the active material/collector/active material was 1.8 mm. The positive electrode plate prepared through coating of one surface of the collector with the positive-electrode active material had a thickness of 0.9 mm; i.e., the thickness of the collector/active material was 0.9 mm.

(3) Preparation of Negative Electrode Plate

Both surfaces of a collector were coated with a negative-electrode active material to prepare a negative electrode plate (three negative electrode plates were prepared; six active-material-coated surfaces in total). Each of these negative electrode plates was prepared as described below in detail. A mixture of powdery zinc oxide (80 parts by weight), powdery zinc (20 parts by weight), and particulate polytetrafluoroethylene (3 parts by weight) was applied onto a collector (thickness: 0.2 mm) composed of punched copper sheet, to prepare a negative electrode plate having a porosity of about 50% and a region of 2 cm by 2 cm coated with the active material. The amount of coating was adjusted so that the active material contained powdery zinc oxide corresponding to a positive electrode plate capacity of 4 Ah. The negative electrode plate prepared through coating of both surfaces of the collector with the negative-electrode active material had a thickness of 0.6 mm; i.e., the thickness of the active material/collector/active material was 0.6 mm.

(4) Assembly of Battery

The positive electrode plates, the negative electrode plates, and the separators provided with the porous substrates were assembled as in Example 2, to prepare a parallelly stacked nickel-zinc secondary battery as illustrated in FIG. 2 having six electrode units each including the positive electrode, the separator; and the negative electrode.

(5) Evaluations

The parallelly stacked nickel-zinc secondary battery including the separator with the porous substrate prepared as described above was evaluated for volume energy density and internal resistance as follows.

<Volume Energy Density>

A battery was prepared by use of a porous substrate having a thickness of 300 μm, and the battery volume was calculated from the dimensions of the battery container. A battery energy of 6.4 Wh (=4 Ah×1.6 V) was divided by the battery volume to calculate a volume energy density (Wh/L) as a reference. For calculation of the volume energy density (Wh/L) of each secondary battery, a variation in the thickness of the porous substrate of the secondary battery was regarded as a variation in the thickness of the battery container, and the battery energy (6.4 Wh) was divided by the battery volume calculated in consideration of the variation in the thickness. The volume energy density (%) of each secondary battery was determined relative to the volume energy density (taken as 100%) of the battery prepared by use of the porous substrate having a thickness of 300 μm.

<Internal Resistance>

The battery was discharged at a constant current, and a closed circuit voltage (CCV) was measured with a charger/discharger two seconds after the initiation of the discharge. The closed circuit voltage (CCV) two seconds after the initiation of the discharge was subtracted from the open circuit voltage (OCV) before the discharge, and the resultant difference was divided by the current, to calculate the internal resistance (Ω) of the battery. As in the case of the volume energy density (%), the internal resistance (%) of each secondary battery was determined relative to the internal resistance (taken as 100%) of the battery prepared by use of the porous substrate having a thickness of 300 μm.

(5a) Relationship Between Thickness of Porous Substrate and Energy Density

Figure 13:
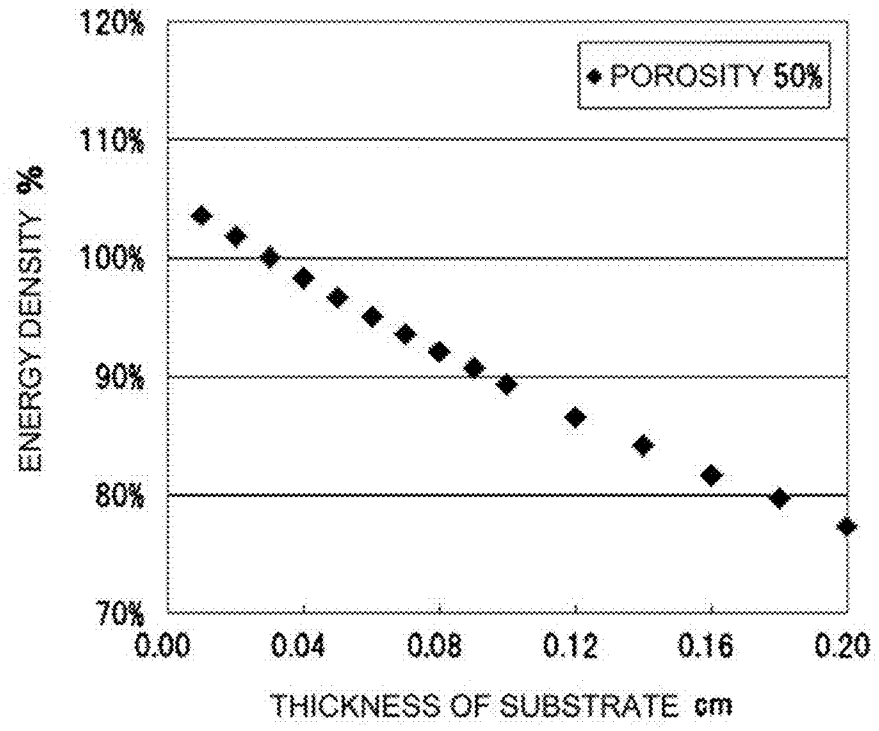
FIG. 13 is a graph illustrating the relationship between the thickness (cm) of a porous substrate and the energy density (%) of a battery as determined in Example 3.

The thickness of a porous substrate having a porosity of 50% (i.e., a relative density of 50%) was varied, and the relationship between the thickness (cm) the porous substrate and the energy density (%) of the battery was examined. The results are illustrated in Table 1. FIG. 13 is a graph showing the relationship between the thickness (cm) of the porous substrate and the energy density (%) of the battery illustrated in Table 2.

TABLE 1

| Porosity of porous substrate: 50% | |
|---|---|
| Porous substrate Thickness (cm) | Battery properties Energy density (%) |
| 0.01 | 104% |
| 0.02 | 102% |
| 0.03 | 100% |
| 0.04 | 98% |
| 0.05 | 97% |
| 0.06 | 95% |
| 0.07 | 94% |
| 0.08 | 92% |
| 0.09 | 91% |
| 0.10 | 89% |
| 0.12 | 86% |
| 0.14 | 84% |
| 0.16 | 82% |
| 0.18 | 80% |
| 0.20 | 77% |

As illustrated in Table 1 and FIG. 13, the thinnest porous substrate sample had a thickness of 100 μm (0.01 cm). The porous substrate having a thickness of 100 μm was readily prepared and handled. Although attempts were made to prepare a porous substrate having a thickness of less than 100 μm (e.g., 80 μm), the resultant porous substrate failed to be evaluated due to breakage during handling (i.e., such a thin porous substrate failed to be prepared). A porous substrate having a thickness of 200 μm or more exhibited superior handleability. As illustrated in FIG. 13, the energy density decreases with an increase in the thickness of the porous substrate. As illustrated in FIG. 13, a high energy density of 80% or more (relative to that in the case of a porous substrate having a thickness of 0.03 cm) is achieved if the thickness of the porous substrate is 1,800 μm or less. In particular, a porous substrate having a thickness of 900 μm or less is preferred in view of achievement of an energy density of 90% or more.

(5b) Relationship Between Porosity of Porous Substrate and Internal Resistance

Figure 14:
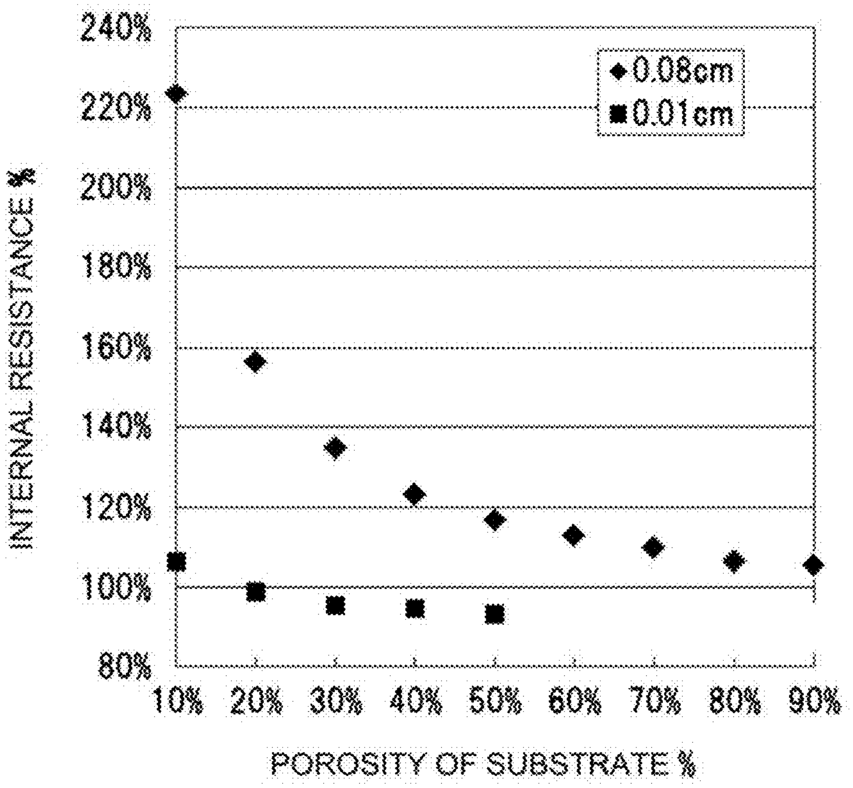
FIG. 14 is a graph illustrating the relationship between the porosity (%) of a porous substrate and the internal resistance (%) of a battery as determined in Example 3.

The porosity of a porous substrate having a thickness of 0.01 cm (100 μm) or 0.08 cm (800 μm) was varied, and the relationship between the porosity (%) of the porous substrate and the internal resistance (% and Ω·cm$^2$) of the battery was examined. The results are illustrated in Tables 2 and 3. FIG. 14 is a graph showing the relationship between the porosity (%) of the porous substrate and the internal resistances (%) of the battery illustrated in Tables 2 and 3. A porous substrate having a thickness of 0.01 cm and a porosity of 60% or more was difficult to prepare and handle; i.e., such a porous substrate was not evaluated.

TABLE 2

| Thickness of porous substrate: 0.01 cm (100 μm) | |
|---|---|
| Porous substrate Porosity % | Battery properties Internal resistance % |
| 10% | 106% |
| 20% | 99% |
| 30% | 96% |
| 40% | 95% |
| 50% | 93% |

TABLE 3

| Thickness of porous substrate: 0.08 cm (800 μm) | |
|---|---|
| Porous substrate Porosity (%) | Battery properties Internal resistance (%) |
| 10% | 223% |
| 20% | 156% |
| 30% | 135% |
| 40% | 123% |
| 50% | 117% |
| 60% | 113% |
| 70% | 109% |
| 80% | 106% |
| 90% | 105% |

As illustrated in Tables 2 and 3, the internal resistance of a battery including a porous substrate having a porosity of at least 10% was able to be measured (i.e., the battery operated practically). In contrast, a battery including a porous substrate having a porosity of 5% exhibited a small current and the internal resistance of the battery failed to be measured (i.e., the battery did not operate practically). Thus, a porous substrate having a porosity of 10% or more was applicable to the secondary battery of the present invention. As illustrated in FIG. 14, a porosity of 20% or more leads to a drastic reduction in resistance regardless of the thickness of the porous substrate. Thus, the porous substrate more preferably has a porosity of 20% or more. A porous substrate having a thickness of 200 μm or more, which is readily prepared, more preferably has a porosity of 30% or more because such a porosity leads to a low internal resistance. A porous substrate having a thickness of 100 μm or 800 μm and a porosity of 30% or more tends to cause a small variation in internal resistance; nevertheless an increase in porosity leads to a decrease in internal resistance. A porous substrate having a porosity exceeding 90% cannot be prepared due to breakage during handling, although a porous substrate having a porosity of up to 90% and a certain level of thickness can be prepared. Thus, a porous substrate having a porosity of 90% or less is preferably used for the secondary battery of the present invention.

As described above, a porous substrate having a small thickness and a porosity exceeding 70% is difficult to handle. A porosity exceeding 70% does not significantly contribute to a reduction in internal resistance. Thus, the porous substrate preferably has a porosity of 70% or less (no data on samples having a porosity exceeding 50% in Table 2 and FIG. 14 indicates that a porous substrate having such a porosity is difficult to prepare).

(5c) Relationship Between T×D/100 Value and Internal Resistance

Porous substrates having various thicknesses and porosities were prepared as illustrated in Tables 4A to 4D. For each porous substrate, the T×D/100 value was determined, where T represents the thickness (μm) of the porous substrate, D represents the relative density (100−P) (%), and P represents the porosity (%) of the porous substrate. The relationship between the T×D/100 value and the internal resistance (%) of the battery was examined. The results are illustrated in FIG. 15.

Figure 15:
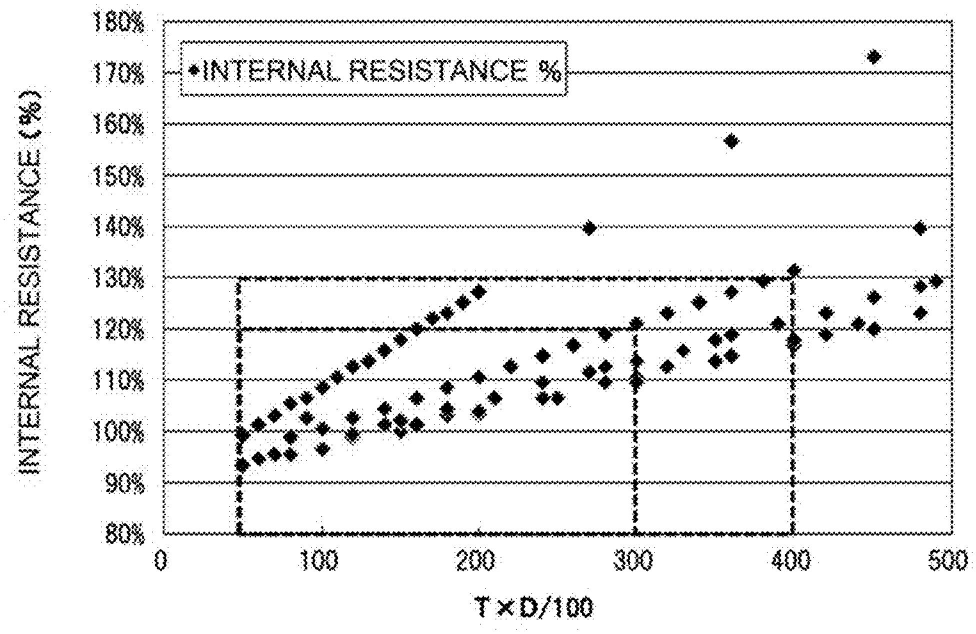
FIG. 15 is a graph illustrating the relationship between the T×D/100 value of a porous substrate (where T represents the thickness (μm) of the porous substrate and D represents the relative density (%) of the porous substrate) and the internal resistance (%) of a battery as determined in Example 3.

As illustrated in FIG. 15, a porous substrate having a T×D/100 value of 50 to 400 readily achieves a low internal resistance of 130% or less. As illustrated in FIG. 15, some samples have a T×D/100 value of more than 400 and a low internal resistance. These samples have a large thickness and a low relative density (i.e., a high porosity); the samples are disadvantageous in terms of energy density and are difficult to prepare. A few samples have a T×D/100 value of 50 to 400 and an internal resistance of 130% or more. These samples have a small thickness and a high relative density (generally a relative density of 90%); the porous substrates are relatively difficult to handle. A porous substrate having a T×D/100 value of 50 to 300 is more preferred because the porous substrate achieves an internal resistance of 120% or less.

TABLE 4A

| Porous substrate | | | | |
|---|---|---|---|---|
| Thickness T (μm) | Porosity P (%) | Relative density D (%) | T × D/100 | Battery properties Internal resistance (%) |
| 100 | 10% | 90% | 90 | 106% |
| 100 | 20% | 80% | 80 | 99% |
| 100 | 30% | 70% | 70 | 96% |
| 100 | 40% | 60% | 60 | 95% |
| 100 | 50% | 50% | 50 | 93% |
| 200 | 10% | 90% | 180 | 123% |
| 200 | 20% | 80% | 160 | 106% |
| 200 | 30% | 70% | 140 | 101% |
| 200 | 40% | 60% | 120 | 99% |
| 200 | 50% | 50% | 100 | 97% |
| 200 | 60% | 40% | 80 | 96% |
| 300 | 10% | 90% | 270 | 140% |
| 300 | 20% | 80% | 240 | 115% |

TABLE 4A-continued

| Porous substrate | | | | |
|---|---|---|---|---|
| Thickness T (μm) | Porosity P (%) | Relative density D (%) | T × D/100 | Battery properties Internal resistance (%) |
| 300 | 30% | 70% | 210 | 106% |
| 300 | 40% | 60% | 180 | 103% |
| 300 | 50% | 50% | 150 | 100% |
| 300 | 60% | 40% | 120 | 99% |
| 300 | 70% | 30% | 90 | 102% |
| 400 | 10% | 90% | 360 | 156% |
| 400 | 20% | 80% | 320 | 123% |
| 400 | 30% | 70% | 280 | 113% |
| 400 | 40% | 60% | 240 | 106% |
| 400 | 50% | 50% | 200 | 103% |
| 400 | 60% | 40% | 160 | 101% |
| 400 | 70% | 30% | 120 | 99% |
| 400 | 80% | 20% | 80 | 99% |

TABLE 4B

| Porous substrate | | | | |
|---|---|---|---|---|
| Thickness T (μm) | Porosity P (%) | Relative density D (%) | T × D/100 | Battery properties Internal resistance (%) |
| 500 | 10% | 90% | 450 | 173% |
| 500 | 20% | 80% | 400 | 131% |
| 500 | 30% | 70% | 350 | 118% |
| 500 | 40% | 60% | 300 | 111% |
| 500 | 50% | 50% | 250 | 106% |
| 500 | 60% | 40% | 200 | 104% |
| 500 | 70% | 30% | 150 | 102% |
| 500 | 80% | 20% | 100 | 100% |
| 500 | 90% | 10% | 50 | 99% |
| 600 | 20% | 80% | 480 | 140% |
| 600 | 30% | 70% | 420 | 123% |
| 600 | 40% | 60% | 360 | 115% |
| 600 | 50% | 50% | 300 | 109% |
| 600 | 60% | 40% | 240 | 106% |
| 600 | 70% | 30% | 180 | 104% |
| 600 | 80% | 20% | 120 | 103% |
| 600 | 90% | 10% | 60 | 101% |
| 700 | 30% | 70% | 490 | 129% |
| 700 | 40% | 60% | 420 | 119% |
| 700 | 50% | 50% | 350 | 114% |
| 700 | 60% | 40% | 280 | 109% |
| 700 | 70% | 30% | 210 | 106% |
| 700 | 80% | 20% | 140 | 104% |
| 700 | 90% | 10% | 70 | 103% |

TABLE 4C

| Porous substrate | | | | |
|---|---|---|---|---|
| Thickness T (μm) | Porosity P (%) | Relative density D (%) | T × D/100 | Battery properties Internal resistance (%) |
| 800 | 40% | 60% | 480 | 123% |
| 800 | 50% | 50% | 400 | 117% |
| 800 | 60% | 40% | 320 | 113% |
| 800 | 70% | 30% | 240 | 109% |
| 800 | 80% | 20% | 160 | 106% |
| 800 | 90% | 10% | 80 | 105% |
| 900 | 50% | 50% | 450 | 120% |
| 900 | 60% | 40% | 360 | 115% |
| 900 | 70% | 30% | 270 | 112% |
| 900 | 80% | 20% | 180 | 108% |
| 900 | 90% | 10% | 90 | 106% |
| 1000 | 60% | 40% | 400 | 118% |
| 1000 | 70% | 30% | 300 | 114% |
| 1000 | 80% | 20% | 200 | 111% |

TABLE 4C-continued

| Porous substrate | | | | |
|---|---|---|---|---|
| Thickness T (μm) | Porosity P (%) | Relative density D (%) | T × D/100 | Battery properties Internal resistance (%) |
| 1000 | 90% | 10% | 100 | 108% |
| 1100 | 60% | 40% | 440 | 121% |
| 1100 | 70% | 30% | 330 | 116% |
| 1100 | 80% | 20% | 220 | 113% |
| 1100 | 90% | 10% | 110 | 111% |
| 1200 | 60% | 40% | 480 | 123% |
| 1200 | 70% | 30% | 360 | 119% |
| 1200 | 80% | 20% | 240 | 115% |
| 1200 | 90% | 10% | 120 | 113% |

TABLE 4D

| Porous substrate | | | | |
|---|---|---|---|---|
| Thickness T (μm) | Porosity P (%) | Relative density D (%) | T × D/100 | Battery properties Internal resistance (%) |
| 1300 | 70% | 30% | 390 | 121% |
| 1300 | 80% | 20% | 260 | 117% |
| 1300 | 90% | 10% | 130 | 114% |
| 1400 | 70% | 30% | 420 | 123% |
| 1400 | 80% | 20% | 280 | 119% |
| 1400 | 90% | 10% | 140 | 116% |
| 1500 | 70% | 30% | 450 | 126% |
| 1500 | 80% | 20% | 300 | 121% |
| 1500 | 90% | 10% | 150 | 118% |
| 1600 | 70% | 30% | 480 | 128% |
| 1600 | 80% | 20% | 320 | 123% |
| 1600 | 90% | 10% | 160 | 120% |
| 1700 | 80% | 20% | 340 | 125% |
| 1700 | 90% | 10% | 170 | 122% |
| 1800 | 80% | 20% | 360 | 127% |
| 1800 | 90% | 10% | 180 | 123% |
| 1900 | 80% | 20% | 380 | 129% |
| 1900 | 90% | 10% | 190 | 125% |
| 2000 | 80% | 20% | 400 | 131% |
| 2000 | 90% | 10% | 200 | 127% |

Examples 4: Production of Zinc-Air Secondary Battery (1) Preparation of Separator Provided with Porous Substrate A separator provided with a porous substrate (hereinafter referred to simply as "separator") (i.e., LDH membrane on alumina substrate) was prepared as in Example 1

(2) Preparation of Air Electrode Layer

Particulate α-$MnO_2$ serving as an air electrode catalyst was prepared as follows: $Mn(SO_4).5H_2O$ and $KMnO_4$ were mixed in a molar ratio of 5:13 and dissolved in deionized water. The resultant mixture was poured into a stainless steel hermetic container lined with Teflon (registered trademark) and subjected to hydrothermal synthesis at 140° C. for two hours. The precipitate obtained through the hydrothermal synthesis was filtered, washed with distilled water, and then dried at 80° C. for six hours, to prepare particulate α-$MnO_2$.

A particulate layered double hydroxide (hereinafter referred to as "particulate LDH") serving as a hydroxide-ion-conductive material was prepared as follows: $Ni(NO_3)_2.6H_2O$ and $Fe(NO_3)_3.9H_2O$ were mixed (molar ratio of Ni:Fe=3:1) and dissolved in deionized water. The resultant mixture was added dropwise to a 0.3M $Na_2CO_3$ solution at 70° C. with agitation. The pH of the mixture was adjusted to 10 by addition of a 2M NaOH solution, and the mixture was maintained at 70° C. for 24 hours. The precipitate produced in the mixture was filtered, washed with distilled water, and then dried at 80° C., to prepare powdery LDH.

The particulate $\alpha$-$MnO_2$, the particulate LDH, and carbon black (VXC72, manufactured by Cabot Corporation) serving as an electron conductive material were weighed in predetermined proportions and then wet-mixed in the presence of ethanol solvent. The resultant mixture was dried at 70° C. and then pulverized. The resultant powder was mixed with a binder (PTFE, EC-TEF-500ML, manufactured by ElectroChem) and water (1 mass % relative to the air electrode) to be fibrillated. The resultant fibrillary mixture was press-bonded to a collector (carbon cloth, EC-CC1-060T, manufactured by ElectroChem) into a sheet having a thickness of 50 tam, to prepare a laminate of an air electrode layer on the collector. The resultant air electrode layer contained the electron conductive phase (carbon black) in an amount of 20 vol. %, the catalyst layer (particulate $\alpha$-$MnO_2$) in an amount of 5 vol. %, the hydroxide-ion-conductive phase (particulate LDH) in an amount of 70 vol. %, and the binder phase (PTFE) in an amount of 5 vol. %.

(3) Preparation of Air Electrode with Separator

An anion-exchange membrane (NEOSEPTA AHA, manufactured by ASTOM Corporation) was immersed in a 1M aqueous NaOH solution overnight. The anion-exchange membrane, serving as an intermediate layer, is disposed on the LDH membrane (separator), to prepare a laminate of the separator on the intermediate layer. The intermediate layer has a thickness of 30 μm. The above-prepared air electrode layer/collector laminate is press-bonded to the separator/intermediate layer laminate such that the air electrode layer is in contact with the intermediate layer, to prepare an air electrode with the separator.

(4) Preparation of Negative Electrode Plate

A mixture of powdery zinc oxide (80 parts by weight), powdery zinc (20 parts by weight), and particulate polytetrafluoroethylene (3 parts by weight) is applied onto a collector composed of punched copper sheet, to prepare a negative electrode plate having a porosity of about 50% and a region coated with the active material.

(5) Preparation of Third Electrode

A platinum paste is applied to a nickel mesh collector to prepare a third electrode.

(6) Assembly of Battery

The air electrode with the separator, the negative electrode plate, and the third electrode are assembled into a horizontal zinc-air secondary battery illustrated in FIG. 3A through the procedure described below. A rectangular parallelepiped container composed of ABS resin and having no lid (hereinafter referred to as "resin container") is provided. The negative electrode plate is disposed on the bottom of the resin container such that the surface coated with the negative-electrode active material faces upward. The negative-electrode collector is in contact with the bottom of the resin container, and one end of the negative-electrode collector is connected to an external terminal penetrating through the side of the resin container. The third electrode is disposed on the inner wall of the resin container at a position above the top surface of the negative electrode (i.e., a position that is not in contact with the negative electrode and is not involved in the charge/discharge reaction), and a non-woven separator is disposed to come into contact with the third electrode. The opening of the resin container is covered with the air electrode with the separator such that the air electrode is exposed to the outside. In this case, an epoxy resin adhesive (EP008, manufactured by CEMEDINE Co., Ltd.) is applied to the periphery of the opening such that the opening is gas- and liquid-tightly sealed with the air electrode. A 6 mol/L aqueous KOH solution, serving as an electrolytic solution, is injected into the resin container through a small inlet provided near the top of the resin container. Thus, the separator is in contact with the electrolytic solution, and the electrolytic solution is always in contact with the third electrode because of the liquid-retaining ability of the non-woven separator despite a variation in amount of the electrolytic solution. In view of the production of the battery in a discharge end state, an excess amount of the electrolytic solution is injected into the resin container such that the region coated with the negative-electrode active material is completely submerged in the electrolytic solution in the container and the amount of the electrolytic solution meets the amount of water that will decrease during a charge mode. Thus, the resin container is designed so as to accommodate the excess amount of the electrolytic solution. The inlet of the resin container is then sealed. The space defined by the resin container and the separator is gas- and liquid-tightly sealed. The third electrode is then connected to the collector layer of the air electrode via an external circuit. The zinc-air secondary battery of the present invention is thereby produced.

As described above, the separator exhibits high density and thus water impermeability and gas impermeability. This configuration of the zinc-air secondary battery physically inhibits the penetration of dendritic zinc (which may be formed during a charge mode of the battery) through the separator, to prevent the short circuit between the positive and negative electrodes. This configuration also inhibits the intrusion of carbon dioxide contained in air, to prevent precipitation of an alkaline carbonate (caused by carbon dioxide) in the electrolytic solution. In addition, hydrogen gas generated from the negative electrode 34 by the side reaction comes into contact with the third electrode 38 to produce water through the above-described reactions. Thus, the zinc-air secondary battery has a configuration suitable for preventing both the short circuit caused by dendritic zinc and the intrusion of carbon dioxide, and can address problems caused by the generation of hydrogen gas; i.e., the zinc-air secondary battery exhibits high reliability.

What is claimed is:

1. A secondary battery comprising:
a positive electrode;
a negative electrode;
an alkaline electrolytic solution;
a ceramic separator that is composed of a hydroxide-ion-conductive inorganic solid electrolyte comprising a layered double hydroxide and separates the positive electrode from the negative electrode;
a porous substrate disposed on at least one surface of the ceramic separator; and
a container accommodating at least the negative electrode and the alkaline electrolytic solution,
wherein the inorganic solid electrolyte is in the form of a membrane or layer densified enough to have water impermeability, and the porous substrate has a thickness of 100 to 1,800 μm.

2. The secondary battery according to claim 1, wherein the porous substrate has a thickness of 200 to 900 μm.

3. The secondary battery according to claim 1, wherein the porous substrate has a porosity of 10 to 90%.

4. The secondary battery according to claim 3, wherein the porous substrate has a porosity of 20 to 70%.

5. The secondary battery according to claim 3, wherein the porous substrate has a porosity of 30 to 70%.

6. The secondary battery according to claim 3, wherein the porous substrate exhibits a T×D/100 value of 50 to 400, where T represents the thickness (μm) of the porous substrate, D represents the relative density (100−P) (%) of the porous substrate, and P represents the porosity (%) of the porous substrate.

7. The secondary battery according to claim 6, wherein the T×D/100 value is 50 to 300.

8. The secondary battery according to claim 1, wherein the porous substrate is composed of at least one selected from the group consisting of ceramic materials, metal materials, and polymer materials.

9. The secondary battery according to claim 8, wherein the porous substrate is composed of a ceramic material, wherein the ceramic material is at least one selected from the group consisting of alumina, zirconia, titania, magnesia, spinel, calcia, cordierite, zeolite, mullite, ferrite, zinc oxide, and silicon carbide.

10. The secondary battery according to claim 1, wherein the layered double hydroxide has a basic composition represented by the formula: $M^{2+}_{1-x}M^{3+}_{x}(OH)_2A^{n-}_{x/n}mH_2O$ where $M^{2+}$ represents a divalent cation, $M^{3+}$ represents a trivalent cation, $A^{n-}$ represents an n-valent anion, n is an integer of 1 or more, and x is 0.1 to 0.4.

11. The secondary battery according to claim 10, wherein $M^{2+}$ comprises $Mg^{2+}$, $M^{3+}$ comprises $Al^{3+}$, and $A^{n-}$ comprises $OH^-$ and/or $CO_3^{2-}$ in the formula.

12. The secondary battery according to claim 10, wherein the layered double hydroxide comprises an aggregation of platy particles, and the platy particles are oriented such that the faces of the particles are substantially perpendicular to or oblique to the surface of the porous substrate.

13. The secondary battery according to claim 1, wherein the inorganic solid electrolyte is densified through hydrothermal treatment.

14. The secondary battery according to claim 1, wherein the negative electrode comprises zinc, a zinc alloy, and/or a zinc compound.

15. The secondary battery according to claim 1, wherein:
the positive electrode comprises nickel hydroxide and/or nickel oxyhydroxide;
the electrolytic solution comprises a positive-electrode electrolytic solution in which the positive electrode is immersed, and a negative-electrode electrolytic solution in which the negative electrode is immersed;
the container accommodates the positive electrode, the positive-electrode electrolytic solution, the negative electrode, the negative-electrode electrolytic solution, the ceramic separator, and the porous substrate; and
the ceramic separator is disposed in the container to separate a positive-electrode chamber accommodating the positive electrode and the positive-electrode electrolytic solution from a negative-electrode chamber accommodating the negative electrode and the negative-electrode electrolytic solution, whereby the battery serves as a nickel-zinc secondary battery.

16. The secondary battery according to claim 1, wherein:
the positive electrode is an air electrode;
the negative electrode is immersed in the electrolytic solution;
the container has an opening and accommodates the negative electrode and the electrolytic solution; and
the ceramic separator is disposed to cover the opening to be in contact with the electrolytic solution and to define a negative-electrode hermetic space with the container, such that the air electrode is separated from the electrolytic solution by the ceramic separator through which hydroxide ions pass, whereby the battery serves as a zinc-air secondary battery.

* * * * *